United States Patent
Katar et al.

(10) Patent No.: US 9,021,278 B2
(45) Date of Patent: Apr. 28, 2015

(54) NETWORK ASSOCIATION OF COMMUNICATION DEVICES BASED ON ATTENUATION INFORMATION

(75) Inventors: Srinivas Katar, Gainesville, FL (US); Lawrence W. Yonge, III, Summerfield, FL (US); Richard Ernest Newman, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 13/564,358

(22) Filed: Aug. 1, 2012

(65) Prior Publication Data

US 2013/0038424 A1 Feb. 14, 2013

Related U.S. Application Data

(60) Provisional application No. 61/522,184, filed on Aug. 10, 2011.

(51) Int. Cl.
*G06F 1/00* (2006.01)
*G06F 1/26* (2006.01)
(Continued)

(52) U.S. Cl.
CPC ............ *G06F 1/3203* (2013.01); *H04L 67/125* (2013.01); *B60L 11/1846* (2013.01); *H02J 7/0004* (2013.01); *H02J 13/0062* (2013.01); *H02J 2007/0001* (2013.01); *Y02T 10/7088* (2013.01); *Y02T 10/7005* (2013.01); *Y02B 90/2638* (2013.01); *Y02T 90/16* (2013.01);
(Continued)

(58) Field of Classification Search
CPC ................................ G06F 1/3203; G06F 7/04

USPC ........................................... 713/310; 340/5.8
See application file for complete search history.

(56) References Cited

U.S. PATENT DOCUMENTS

| | | | |
|---|---|---|---|
| 4,862,122 | A | 8/1989 | Blair, Jr. et al. |
| 5,341,083 | A | 8/1994 | Klontz et al. |

(Continued)

FOREIGN PATENT DOCUMENTS

| | | |
|---|---|---|
| CN | 1836424 | 9/2006 |
| CN | 103222229 | 7/2013 |

(Continued)

OTHER PUBLICATIONS

HomePlug Green PHY Specification Release Version 1.00, HomePlug Powerline Alliance, Jun. 14, 2010, 726 pages.

(Continued)

*Primary Examiner* — Thomas Lee
*Assistant Examiner* — Robert Cassity
(74) *Attorney, Agent, or Firm* — DeLizio Gilliam, PLLC

(57) ABSTRACT

An electric vehicle can be configured to execute an association procedure with one or more charging stations in a charging facility to securely connect to and receive electric power from one of the charging stations. The electric vehicle can broadcast one or more service matching messages to the charging stations and, in response, can receive attenuation information from one or more of the charging stations. The electric vehicle can analyze the attenuation information received from the charging stations to identify with which charging station the electric vehicle should associate (e.g., to determine which charging station should provide electric power to the electric vehicle). The electric vehicle can then associate with (and receive electric power from) the identified charging station.

40 Claims, 6 Drawing Sheets

(51) Int. Cl.
*G06F 1/32* (2006.01)
*H04L 29/08* (2006.01)
*B60L 11/18* (2006.01)
*H02J 7/00* (2006.01)
*H02J 13/00* (2006.01)

(52) U.S. Cl.
CPC .............. *Y02T90/163* (2013.01); *Y02T 90/168* (2013.01); *Y02T 90/169* (2013.01); *Y02T 90/14* (2013.01); *Y02T 90/128* (2013.01); *Y04S 30/12* (2013.01); *Y04S 30/14* (2013.01); *Y04S 40/124* (2013.01)

(56) References Cited

U.S. PATENT DOCUMENTS

| | | | |
|---|---|---|---|
| 6,182,139 B1* | 1/2001 | Brendel | 709/226 |
| 6,252,674 B1* | 6/2001 | Takaoka | 358/1.5 |
| 6,396,241 B1 | 5/2002 | Ramos et al. | |
| 6,978,142 B2 | 12/2005 | Jokimies | |
| 8,161,547 B1* | 4/2012 | Jennings et al. | 726/22 |
| 8,429,396 B1* | 4/2013 | Trivedi et al. | 713/150 |
| 2003/0125058 A1* | 7/2003 | Matsutani et al. | 455/507 |
| 2004/0252668 A1 | 12/2004 | Ozukturk et al. | |
| 2005/0215263 A1 | 9/2005 | Tsien et al. | |
| 2005/0273803 A1 | 12/2005 | Takagi et al. | |
| 2006/0014547 A1 | 1/2006 | Walter | |
| 2006/0136457 A1 | 6/2006 | Park et al. | |
| 2006/0195464 A1 | 8/2006 | Guo | |
| 2007/0091864 A1 | 4/2007 | Honjo et al. | |
| 2007/0097853 A1 | 5/2007 | Khandekar et al. | |
| 2007/0230506 A1 | 10/2007 | Zou | |
| 2008/0025382 A1 | 1/2008 | Okado | |
| 2008/0040296 A1 | 2/2008 | Bridges et al. | |
| 2008/0155093 A1* | 6/2008 | Dharmistan | 709/224 |
| 2008/0228613 A1 | 9/2008 | Alexander | |
| 2008/0270528 A1 | 10/2008 | Girardeau et al. | |
| 2008/0301446 A1* | 12/2008 | Yonge et al. | 713/171 |
| 2009/0091291 A1 | 4/2009 | Woody | |
| 2009/0091864 A1 | 4/2009 | Carey et al. | |
| 2009/0261779 A1 | 10/2009 | Zyren | |
| 2009/0288129 A1 | 11/2009 | Wolfe et al. | |
| 2010/0049610 A1 | 2/2010 | Ambrosio et al. | |
| 2010/0161482 A1 | 6/2010 | Littrell | |
| 2010/0161518 A1 | 6/2010 | Littrell | |
| 2010/0211643 A1 | 8/2010 | Lowenthal et al. | |
| 2010/0269153 A1 | 10/2010 | Kato et al. | |
| 2010/0274570 A1 | 10/2010 | Proefke et al. | |
| 2010/0274697 A1 | 10/2010 | Zyren | |
| 2010/0315197 A1 | 12/2010 | Solomon et al. | |
| 2011/0010043 A1 | 1/2011 | Lafky | |
| 2011/0022641 A1 | 1/2011 | Werth et al. | |
| 2011/0025267 A1 | 2/2011 | Kamen et al. | |
| 2011/0096682 A1 | 4/2011 | Koch et al. | |
| 2011/0099376 A1 | 4/2011 | Gupta et al. | |
| 2011/0184587 A1 | 7/2011 | Vamos et al. | |
| 2011/0191265 A1 | 8/2011 | Lowenthal et al. | |
| 2011/0195738 A1* | 8/2011 | Hapsari et al. | 455/517 |
| 2011/0213983 A1* | 9/2011 | Staugaitis et al. | 713/176 |
| 2011/0254505 A1* | 10/2011 | Evander et al. | 320/109 |
| 2011/0264530 A1 | 10/2011 | Santangelo et al. | |
| 2011/0279082 A1 | 11/2011 | Hagenmaier, Jr. et al. | |
| 2012/0089286 A1 | 4/2012 | Nakata | |
| 2012/0131360 A1 | 5/2012 | Zyren et al. | |
| 2012/0281582 A1 | 11/2012 | Yang et al. | |
| 2013/0160086 A1 | 6/2013 | Katar et al. | |

FOREIGN PATENT DOCUMENTS

| | | |
|---|---|---|
| CN | 103765857 | 4/2014 |
| CN | 103843304 | 6/2014 |
| EP | 1180886 A1 | 2/2003 |
| EP | 1324546 A1 | 7/2003 |
| EP | 0862346 A2 | 10/2005 |
| EP | 2222107 | 8/2010 |
| GB | 2472537 A | 2/2011 |
| JP | 2003012099 | 1/2003 |
| JP | 2006158087 | 6/2006 |
| JP | 2006262570 | 9/2006 |
| JP | 2007069923 | 3/2007 |
| JP | 2007110373 | 4/2007 |
| JP | 2008077267 | 4/2008 |
| JP | 2008227614 | 9/2008 |
| JP | 2009094768 | 4/2009 |
| JP | 2009254052 | 10/2009 |
| JP | 2010017006 | 1/2010 |
| JP | 2010074336 | 4/2010 |
| JP | 2010079583 | 4/2010 |
| JP | 2010206655 | 9/2010 |
| JP | 2011034500 | 2/2011 |
| KR | 20080007188 | 1/2008 |
| KR | 1020100003315 | 7/2011 |
| KR | 1020140027497 | 3/2014 |
| KR | 1020140047159 | 4/2014 |
| WO | 9530263 | 9/1995 |
| WO | 9530263 A1 | 11/1995 |
| WO | 2004109439 A2 | 12/2004 |
| WO | 20041109439 | 12/2004 |
| WO | 2010009502 | 1/2010 |
| WO | 2010043659 A1 | 4/2010 |
| WO | 2010064515 | 10/2010 |
| WO | 2012071263 | 5/2012 |
| WO | 2013023164 | 2/2013 |

OTHER PUBLICATIONS

International Preliminary Report on Patentability—PCT/US2011/061360, The International Bureau of WIPO—Geneva, Switzerland, Mar. 6, 2013.
International Search Report and Written Opinion—PCT/US2011/061360—ISA/EPO—Mar. 15, 2012.
International Search Report and Written Opinion—PCT/US2012/050402—ISA/EPO—Mar. 1, 2013.
"PCT Application No. PCT/US12/43415 International Search Report", Oct. 10, 2012, 10 pages.
"U.S. Appl. No. 12/980,758 Office Action", Feb. 28, 2013, 19 pages.
Co-pending Provisional U.S. Appl. No. 61/522,184, filed Aug. 10, 2011, 49 pages.
Co-pending Provisional U.S. Appl. No. 61/499,562, filed Jul. 21, 2011, 24 pages.
Co-pending Non-Provisional U.S. Appl. No. 13/527,486, filed Jul. 21, 2011, 24 pages.
PCT Application No. PCT/US2012/043415 Written Opinion of the IPEA, May 21, 2013, 5 Pages.
"U.S. Appl. No. 12/980,758 Final Office Action", Aug. 8, 2013, 17 pages.
"U.S. Appl. No. 13/527,486 Office Action", Jul. 26, 2013, 49 pages.
"U.S. Appl. No. 12/980,758 Final Office Action", Nov. 15, 2013, 23 pages.
"U.S. Appl. No. 13/527,486 Final Office Action", Jan. 6, 2014, 46 pages.
"Taiwan Patent Application No. 101129015 Office Action", May 26, 2014, 11 pages.
"U.S. Appl. No. 13/527,486 Office Action", Jun. 10, 2014, 68 pages.
"U.S. Appl. No. 12/980,758 Non Final Office Action", Jul. 3, 2014, 26 Pages.
"Japanese Patent Application No. 2013-540046, Office Action", May 20, 2014, 12 pages.
"Taiwan Search Report—TW101129015—TIPO—May 22, 2014.", May 22, 2014, 1 page.
"U.S. Appl. No. 12/980,758 Final Office Action", Mar. 6, 2014, 9 Pages.
"Chinese Application No. 201180055769.8, First Office Action", Jan. 4, 2015, 11 pages.
"Korean Patent Application No. 1020147001689, KIPO Notice of Grounds for Rejection", Oct. 28, 2014, 22 pages.
"Korean Patent Application No. 2013-7015957, KIPO Notice of Grounds for Rejection", Oct. 23, 2014, 10 pages.

(56) References Cited

OTHER PUBLICATIONS

"Japanese Patent Application No. 2014517134, Office Action", Dec. 17, 2014, 7 pages.

"Japanese Patent Application No. 2014-525181, Office Action", Feb. 24, 2015, 4 pages.

"Korean Patent Application No. 10-2014-0047159, KIPO Notice of Grounds for Rejection", Jan. 19, 2015, 6 pages.

Kazuya, et al., "Multi-service System on Mesh Networks", IEICE Technical Report, Japan, The Institute of Electronics, Information and Communication Engineers, vol. 109, No. 443, Feb. 25, 2010, pp. 65-70.

* cited by examiner

NETWORK ASSOCIATION OF COMMUNICATION DEVICES BASED ON ATTENUATION INFORMATION

RELATED MATTER(S)

This application claims the priority benefit of U.S. Provisional Application No. 61/522,184 filed on Aug. 10, 2011.

BACKGROUND

Embodiments of the inventive subject matter generally relate to the field of communication networks and, more particularly, to a mechanism for attenuation level based association in communication networks.

An electric vehicle typically charges from a conventional power outlet or a dedicated charging station. Prior to receiving power from the charging station, the electric vehicle can connect to and associate with an appropriate charging station in a charging facility. The charging station can also ensure that the user of the electric vehicle has proper authorization to receive the electric power and to pay for the received electric power.

SUMMARY

Various embodiments of a mechanism for signal level attenuation characterization in a communication network are disclosed. In one embodiment, one or more multi-network broadcast service matching messages are transmitted from a client network device to at least a subset of a plurality of target network devices of one or more networks. The client network determines with which of the plurality of target network devices to associate in the one or more networks based, at least in part, on attenuation information received at the client network device from at least one or more of the subset of the plurality of target network devices.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
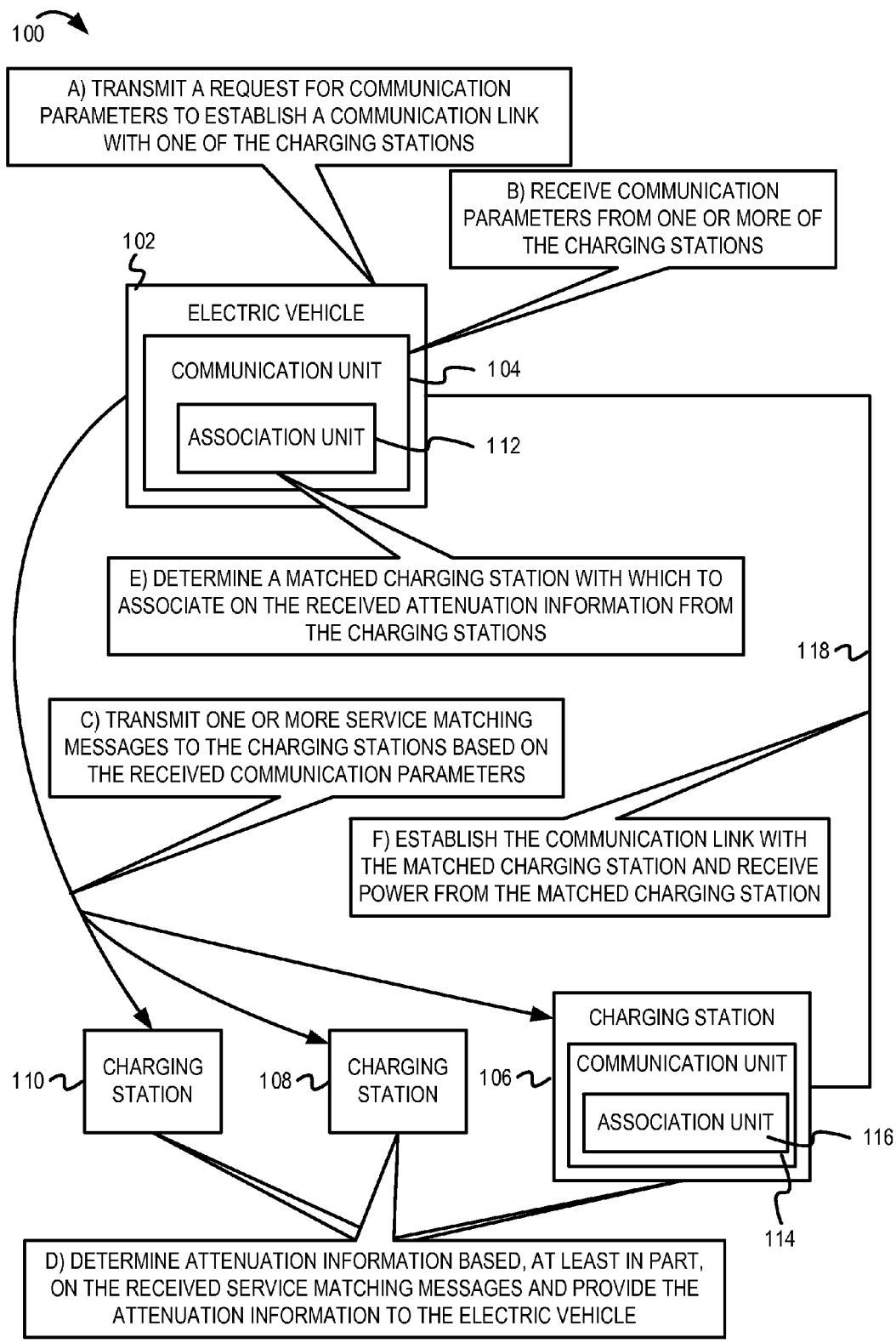
FIG. 1 is an example conceptual diagram illustrating an association procedure between an electric vehicle and one or more charging stations in a charging facility.

The description that follows includes exemplary systems, methods, techniques, instruction sequences, and computer program products that embody techniques of the present inventive subject matter. However, it is understood that the described embodiments may be practiced without these specific details. For instance, although examples refer to executing an attenuation level based association procedure in a powerline communication (PLC) network (e.g., a HomePlug® Green PHY network), embodiments are not so limited. In other embodiments, the operations described herein for signal level attenuation characterization can be executed in other suitable shared communication networks (e.g., a HomePlug AV network, a Multimedia over Coax Alliance (MoCA) network, an Ethernet over Coax (EoC), wireless local area networks (WLAN) such as IEEE 802.11 networks, etc.). In other instances, well-known instruction instances, protocols, structures, and techniques have not been shown in detail in order not to obfuscate the description.

Communication between an electric vehicle and a charging station may be accomplished using a power cable that is used to connect the electric vehicle to the charging station in a charging facility. However, using the power cable to exchange communications can result in signal leakage because other charging stations (of the charging facility) that are not physically connected to the electric vehicle may also receive (e.g., via RF coupling) the signal intended for the charging station that is physically connected to the electric vehicle. Accordingly, the electric vehicle may detect (e.g., receive response messages from) many charging stations in the charging facility and may need to identify and associate with one of the charging stations to which it is physically connected and from which it should receive electric power.

In some embodiments, the electric vehicle and one or more charging stations in the charging facility can be configured to implement an association procedure between the electric vehicle and the appropriate charging station. In accordance with this association procedure, the electric vehicle can use multi-network broadcast communications to broadcast one or more service matching messages to the charging stations in the charging facility. The electric vehicle can receive attenuation information (e.g., a measured signal level) from one or more of the charging stations in response to the broadcast service matching messages. The electric vehicle can analyze the attenuation information received from the charging stations to identify which charging station should provide electric power to the electric vehicle (i.e., to identify a "matched" charging station for the electric vehicle). The electric vehicle can then associate with (and receive electric power from) the matched charging station. Such an association procedure that uses attenuation information (or detected signal level information) received from multiple charging stations to automatically detect the charging station to which the electric vehicle is physically connected can simplify the electric vehicle charging process for a user. Furthermore, in some embodiments, the electric vehicle and the charging stations can employ a secure association procedure by signing messages exchanged between the electric vehicle and the charging stations with their respective encryption keys. Using the secure association procedure can enable the electric vehicle and the charging stations to validate each received communication. This can ensure that malicious electric vehicles that generate strong signals are not matched (and do not receive service) instead of a legitimate electric vehicle. Executing the secure association procedure where each communication is numbered, then signed and/or encrypted can minimize replay attacks and transmission/reception of spoofed messages.

FIG. 1 is an example conceptual diagram illustrating an association procedure between an electric vehicle and one or more charging stations in a charging facility 100. In FIG. 1, the charging facility 100 comprises an electric vehicle 102 and charging stations 106, 108, and 110. The electric vehicle 102 comprises a communication unit 104. The communication unit 104 comprises an association unit 112. The charging station 106 also comprises a communication unit 114. The communication unit 114 comprises an association unit 116. It is noted that although not depicted in FIG. 1, the charging stations 108 and 110 can each comprise a communication unit and an association unit. The functionality for executing the association procedure and identifying the matched charging station (e.g., the communication unit 104 or the communication unit 114) can be implemented on a suitable circuit board, such as an integrated circuit (IC), a system-on-a-chip (SoC), an application specific IC (ASIC), etc. In some embodiments, the functionality for executing the association procedure can be implemented across multiple chips on a circuit board, across multiple circuit boards, etc. The communication unit 104 can implement protocols and functionality to enable the electric vehicle 102 to communicate with one or more of the charging stations 106, 108, and 110 in the charging facility 100. Likewise, the communication unit 114 (of the charging station 106) can implement protocols and functionality to enable the charging station 106 to communicate with the electric vehicle 102 (and in some embodiments, with the other charging stations 108 and 110). In some embodiments, the charging facility 100 can be a shared communication network (e.g., a powerline communication (PLC) network, such as a HomePlug® Green PHY network). In other embodiments, the charging facility 100 can be other suitable types of networks (e.g., Ethernet over Coax (EoC), wireless local area networks (WLAN), such as IEEE 802.11 networks, etc.). The charging stations 106, 108, and 110 can be communicatively coupled using wireless communication protocols (e.g., WLAN, Bluetooth, etc.) or using wired communication protocols (e.g., PLC, Ethernet, etc.). It is also noted that in some embodiments, the association procedure may be implemented using messages and the framework of the Signal Level Attenuation Characterization (SLAC) procedure of the HomePlug® Green PHY specification to enable association between the electric vehicle 102 and one of the charging stations of the charging facility 100. FIGS. 1-5 will be described below using examples of the SLAC procedure of the HomePlug Green PHY specification. However, in other embodiments, the association procedure may be implemented using messages and the framework of other suitable communication technologies.

In some embodiments, a circuit board that implements the association functionality may be used as part of the electric vehicle and also as part of the charging station. Accordingly, prior to initiating the association procedure, the electric vehicle 102 can be configured in a slave/client operating mode while the charging stations 106, 108, and 110 can be configured in a master operating mode. For example, a Green PHY module (e.g., the communication unit 104) of the electric vehicle 102 can be configured to not be a central coordinator of a network. In this example, a Higher Layer Entity (HLE) of the electric vehicle 102 can provide a suitable message (e.g., an APCM_SET_CCo.REQ primitive) to configure the Green PHY module of the electric vehicle 102 to not be a central coordinator of a network that the electric vehicle joins and to, instead, be a client/slave of the network. The Green PHY module of the electric vehicle 102 can provide a confirmation message (e.g., an APCM_SET_CCo.CNF message) to the HLE of the electric vehicle 102 to indicate that it has been successfully configured in the client operating mode. The electric vehicle 102 may also be configured to initiate the association procedure and to be a transmitter of the service matching messages. For example, the HLE of the electric vehicle 102 can provide a suitable message (e.g., an APCM_CONF_SLAC.REQ message) to configure the Green PHY module (e.g. the communication unit 104) of the electric vehicle 102 to execute those operations of the association procedure that are associated with a transmitter of the service matching messages. The Green PHY module of the electric vehicle 102 can provide a confirmation message (e.g., an APCM_CONF_SLAC.CNF message) to the HLE of the electric vehicle 102 to indicate successful configuration. Likewise, a Green PHY module of the charging station 106 (e.g., the communication unit 114 of the charging station 106) can be configured to be a central coordinator of a network. In this example, the HLE of the charging station 106 can provide a suitable message to configure the Green PHY module of the charging station 106 to be the central coordinator of a network that the charging station 106 joins. The HLE of the charging station 106 can provide a suitable message to configure the Green PHY module of the charging station 106 to execute those operations of the association procedure that are associated with a receiver of the service matching messages. It is noted that in other embodiments, other suitable techniques and communication protocols can be implemented to configure the electric vehicle 102 and the charging station 106 in the appropriate operating mode.

It is noted, however, that the configuration of the electric vehicle 102 and the charging stations 106, 108, and 110 may be implementation dependent. In one embodiment, the electric vehicle 102 and the charging stations 106, 108, and 110 may be permanently configured (e.g., in the client operating mode or the master operating mode) during a manufacturing process or before deployment. In another embodiment, the electric vehicle 102 and the charging stations 106, 108, and 110 may be configured on-the-fly, before the association procedure is initiated. In another embodiment, the charging stations 106, 108, and 110 may be permanently configured during the manufacturing process; while the electric vehicle 102 may be dynamically configured before the association procedure is initiated, or vice versa. In another embodiment, the Green PHY modules in the electric vehicle 102 and the charging stations 106, 108, and 110 may automatically detect whether they are part of an electric vehicle or a charging station and may automatically configure themselves accordingly. For example, the configuration of the charging station 106 may be determined depending on whether an electric vehicle 102 is associated with the charging station 106.

The electric vehicle 102 can execute the association procedure with the charging stations 106, 108, and 110 to associate with and receive electric power from one of the charging stations 106, 108, and 110 based on attenuation information (or signal level information) received from one or more of the charging stations 106, 108, and 110, as will be further described below in stages A-F.

At stage A, the association unit 112 of the electric vehicle 102 transmits a request for association parameters to establish a communication link with one of the charging stations 106, 108, and 110. In some embodiments, the electric vehicle 102 (e.g., the higher level entity (HLE) of the electric vehicle) can determine that the electric vehicle 102 is connected to a charging station using a charging cordset. Accordingly, the association unit 112 can initiate the association procedure by broadcasting the request for communication parameters ("communication parameters request message"). After broadcasting the communication parameters request message, the association unit 112 can also start a communication parameters timer to track the reception of the communication parameters from one or more of the charging stations 106, 108, and 110. As part of the communication parameters request message, the association unit 112 may also indicate whether or not it supports a secure association procedure. In accordance with the secure association procedure, the electric vehicle 102 and the charging stations 106, 108, and 110 can sign/encrypt all subsequent communications for the recipient to accept the communications.

At stage B, the association unit 112 of the electric vehicle 102 receives the communication parameters from one or more of the charging stations 106, 108, and 110. The charging stations 106, 108, and 110 can use the communication parameters to control the behavior of the electric vehicle 102. In response to receiving the communication parameters request message, each of the charging stations 106, 108, and 110 can transmit a communication parameters response message including the communication parameters associated with the charging station. Each of the charging stations 106, 108, and 110 can also indicate, in their respective communication parameters response message, whether or not the charging station supports the secure association procedure. In some embodiments, the charging stations 106, 108, and 110 may also attempt to negotiate what type of security mechanisms should be employed. For each of the charging stations 106, 108, and 110, the communication parameters can include a number of service matching messages that should be transmitted to the charging station and other suitable parameters, as will be further discussed below in FIGS. 2-5. Based on receiving the communication parameters, the association unit 112 of the electric vehicle 102 can also determine whether to execute the secure association procedure with the charging stations 106, 108, and 110. If the association unit 112 determines that the secure association procedure should be executed with the charging stations 106, 108, and 110, then prior to transmitting the service matching messages (described below in stage C), the association unit 112 can transmit its security information (e.g., public key certificates) to the charging stations 106, 108, and 110 and can receive security information associated with the charging stations 106, 108, and 110. If the secure association procedure is executed, subsequent communications between the electric vehicle 102 and the charging stations 106, 108, and 110 (and between the charging stations 106, 108, and 110 and the electric vehicle 102) can be signed with the appropriate security information.

At stage C, the association unit 112 transmits one or more service matching messages to the charging stations 106, 108, and 110 based on the received communication parameters. For example, based on the communication parameters received from the charging stations 106, 108, and 110, the association unit 112 can determine how many service matching messages should be broadcast. The association unit 112 can then broadcast the determined number of service matching messages (also referred to as multi-network sounds or M-sounds) using multi-network broadcast (MNBC) communication. As discussed above, if the association unit 112 determines that the secure association procedure should be executed with the charging stations 106, 108, and 110, the association unit 112 can sign the service matching messages prior to broadcasting the service matching messages.

At stage D, the charging stations 106, 108, and 110 determine their respective attenuation information (or signal level information) based, at least in part, on the received service matching messages and provide the attenuation information to the electric vehicle 102. For example, the association unit 116 of the charging station 106 can determine the measured signal strength of the received service matching messages at different carrier frequencies and can notify the electric vehicle of the measured signal strength, as will be further described below with reference to FIG. 4. After all the service matching messages are received or after a predetermined time interval elapses, the charging stations 106, 108, and 110 can transmit their respective attenuation information to the electric vehicle 102. It is noted that if the secure association procedure is executed, each of the charging stations 106, 108, and 110 can validate the received service matching messages prior to determining their respective attenuation information. Additionally, the charging stations 106, 108, and 110 can sign the attenuation information using their respective security information (e.g., signing key) prior to transmitting the attenuation information to the electric vehicle 102.

At stage E, the association unit 112 of the electric vehicle 102 determines a charging station ("matched charging station") with which the electric vehicle should associate based on the attenuation information received from the charging stations 106, 108, and 110. The association unit 112 can analyze the received attenuation information and can select one of the charging stations (e.g., the charging station 106) as the matched charging station. The matched charging station is typically the charging station 106 to which the electric vehicle 102 is physical connected and from which the electric vehicle 102 will receive electric power. For example, the charging station 106 that is associated with the lowest attenuation level (or highest signal level) can be selected as the matched charging station. The association unit 112 can transmit a match notification message to the matched charging station 106 to notify the matched charging station 106 of the results of the association procedure.

At stage F, the communication unit 104 establishes the communication link 118 with the matched charging station 106 and receives power from the matched charging station 106. In response to receiving the match notification message from the electric vehicle 102, the matched charging station 106 (e.g., the association unit 116) can transmit a match confirmation message to the electric vehicle 102. The match confirmation message can include a network identifier (NID) of a network associated with the matched charging station 106, a network membership key (NMK) of the network associated with the matched charging station 106, a MAC address of the matched charging station 106, etc. Additionally, the matched charging station 106 can sign all or part of the match confirmation message using its security information (e.g., signing key) and encrypt all or part of the match confirmation message (e.g., NID and NMK) using the security information (e.g., public encryption key) of the electric vehicle 102 prior to transmitting all or part of the match confirmation message to the electric vehicle 102. The electric vehicle 102 and the matched charging station 106 can each configure themselves using the NID and the NMK of the network associated with the matched charging station 106. The electric vehicle 102 and the matched charging station 106 can form an AV logical network (AVLN). After the matched charging station 106 (e.g., an authentication unit of the matched charging station 106) successfully authenticates and authorizes the electric vehicle 102, the electric vehicle 102 can receive electric power from the matched charging station 106 (e.g., from a charging unit of the matched charging station 106).

Figure 2:
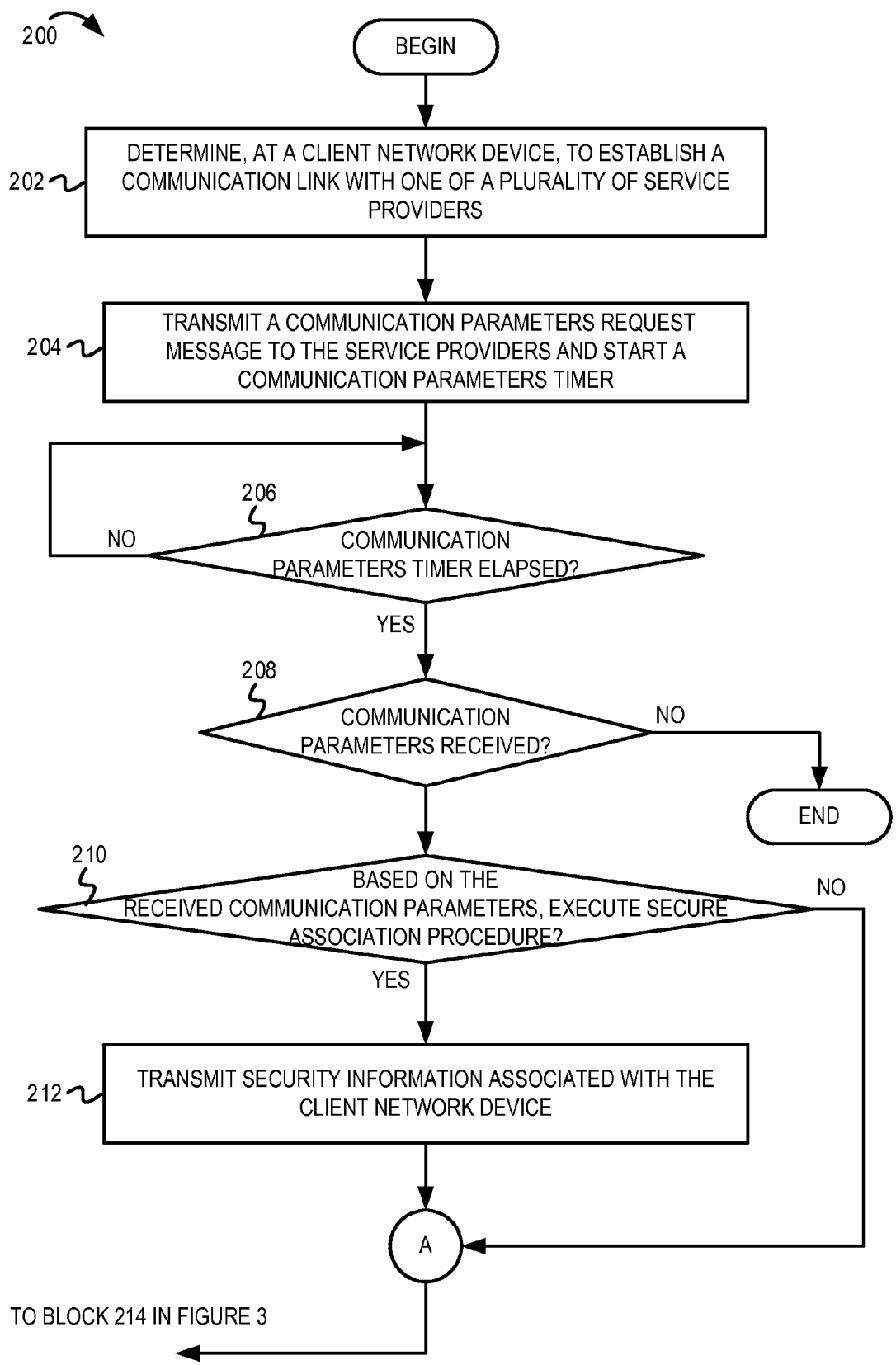
FIG. 2 is a flow diagram illustrating example operations of a client network device executing an association procedure to establish a communication link with a service provider of a communication network.
Figure 3:
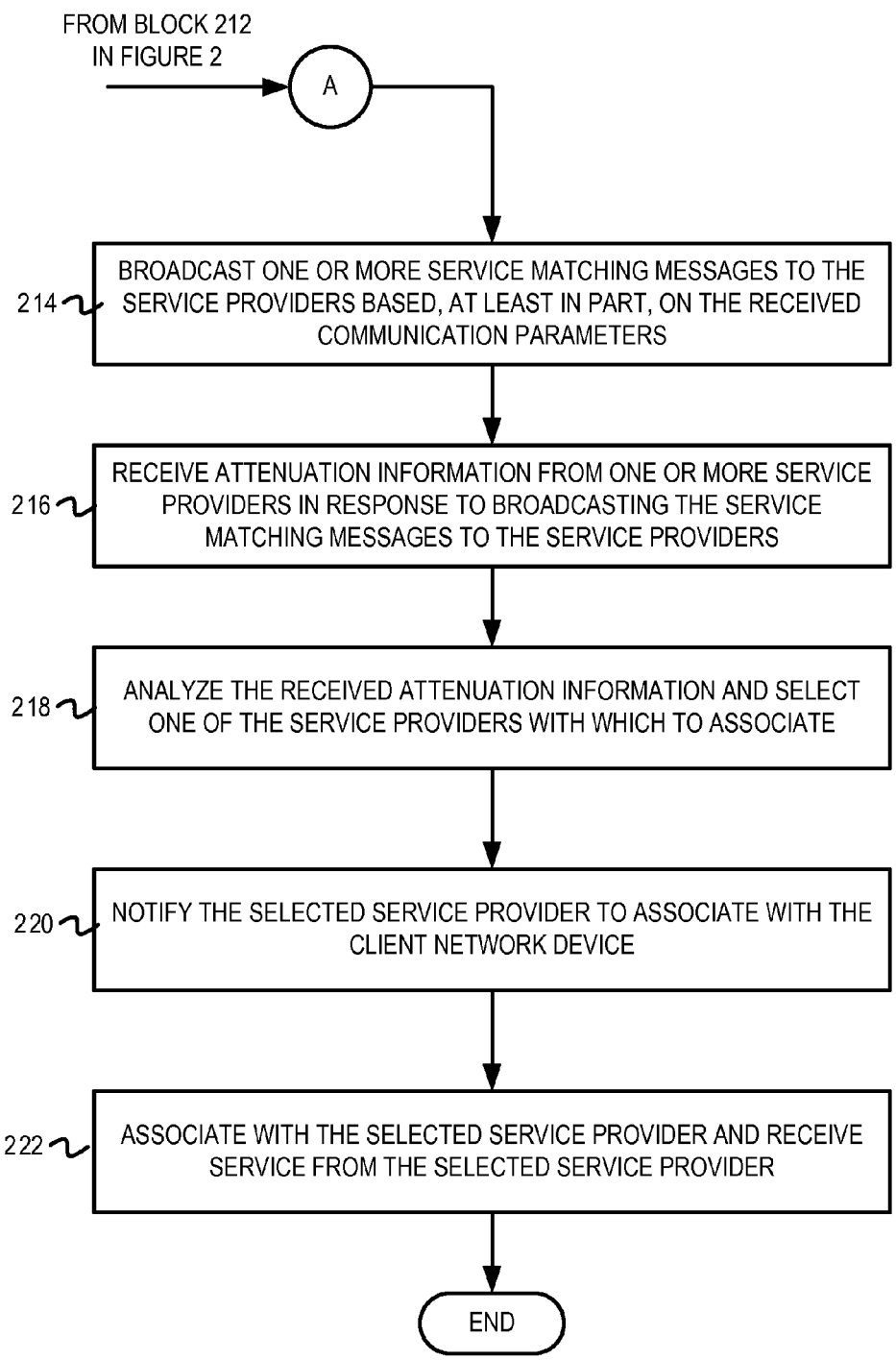
FIG. 3 is a continuation of FIG. 2 and also illustrates example operations of the client network device executing the association procedure to establish the communication link with a service provider of the communication network.

FIG. 2 and FIG. 3 depict a flow diagram ("flow") 200 illustrating example operations of a network device executing an association procedure for establishing a communication link with a service provider of a communication network. The flow begins at block 202 in FIG. 2. It is noted that FIGS. 2-3 will be described below using example messages and framework of the SLAC procedure of the HomePlug Green PHY specification.

At block 202, a client network device determines to establish a communication link with one of a plurality of service providers. In some embodiments, the client network device can be a plug-in electric vehicle (PEV); while the service providers can each be an electric vehicle supply equipment (EVSE) also referred to as a charging station. With reference to the example of FIG. 1, the association unit 112 of the electric vehicle 102 can determine that the electric vehicle 102 is connected to one of the charging stations 106, 108, and 110 using a charging cordset. Accordingly, the association unit 112 can configure the electric vehicle 102 in a client operating mode and can initiate the association procedure with the charging stations 106, 108, and 110. The flow continues at block 204.

At block 204, a communication parameters request message for communication parameters is transmitted to the service providers and a communication parameters timer is initiated. With reference to the example of FIG. 1, the association unit 112 of the electric vehicle 102 can broadcast the communication parameters request message (e.g., a CM_SLAC_PARM.REQ message) to receive communication parameters associated with the charging stations 106, 108, and 110. In some embodiments, the communication parameters request message can be a multi-network broadcast (MNBC) message. As will be further described below, the association unit 112 can use the communication parameters (received from the charging stations 106, 108, and 110) to execute the association procedure with the charging stations 106, 108, and 110. In some embodiments, the communication parameters request message can comprise an identifier of the electric vehicle 102, an indication of whether the electric vehicle supports a secure association procedure, etc. After broadcasting the communication parameters request message, the association unit 112 can also start the communication parameters timer to track the reception of the communication parameters from one or more charging stations 106, 108, and 110. The value in the communication parameters timer can indicate the amount of time for which the association unit 112 will wait to receive the communication parameters from one or more of the charging stations 106, 108, and 110. The flow continues at block 206.

At block 206, it is determined whether the communication parameters timer has elapsed. With reference to the example of FIG. 1, the association unit 112 can determine whether the communication parameters timer has elapsed. As discussed above, the communication parameters timer can indicate a maximum time interval for which the association unit 112 (of the electric vehicle 102) will wait to receive the communication parameters from the charging stations 106, 108, and 110. If it is determined that the communication parameters timer has elapsed, the flow continues at block 208. Otherwise, the flow loops back to block 206, where the association unit 112 continues to determine whether the communication parameters timer has elapsed.

At block 208, it is determined whether the communication parameters were received at the client network device. The flow 200 moves from block 206 to block 208 in response to determining that the communication parameters timer has elapsed. With reference to the example of FIG. 1, the association unit 112 of the electric vehicle 102 can determine whether a communication parameters response message (e.g., a CM_SLAC_PARM.CNF message) including the communication parameters was received from at least one of the charging stations 106, 108, and 110. If it is determined that the communication parameters were received from at least one of the charging stations 106, 108, and 110, the flow continues at block 210. Otherwise, if it is determined that the communication parameters were not received at the network device (after the communication parameters timer has elapsed), the flow ends. It is noted, however, that in other embodiments, if it is determined that the communication parameters were not received at the network device (after the communication parameters timer has elapsed), the association unit 112 can restart the association procedure by rebroadcasting the communication parameters request message to all the charging stations 106, 108, and 110.

At block 210, it is determined, based on the received communication parameters, whether operations for the secure association procedure should be executed. With reference to the example of FIG. 1, the association unit 112 can receive the communication parameters response message (e.g., a CM_SLAC_PARM.CNF message) including the communication parameters from the charging stations 106, 108, and 110. The communication parameters response message (e.g., received from the charging station 106) can comprise an identifier (e.g., a MAC address) of the charging station 106, an identifier of the electric vehicle 102, an indication of whether the charging station 106 supports the secure association procedure, and other suitable information. The communication parameters associated with the charging station 106 can comprise a number of service matching messages that should be transmitted to the charging station 106, a maximum time interval within which the service matching messages should be transmitted to the charging station 106, etc. It is noted that each of the charging stations 106, 108, and 110 may transmit a different set of communication parameters to the electric vehicle 102. The association unit 112 can consolidate the received communication parameters and execute the association procedure with the charging stations 106, 108, and 110 in accordance with the consolidated communication parameters.

With reference to the example of FIG. 1, the association unit 112 can determine (based on the received communication parameters response messages) whether the charging stations 106, 108, and 110 support the secure association procedure. In some embodiments, if the electric vehicle 102 supports the secure association procedure, the electric vehicle 102 can support one or more encryption protocols such as digital signature algorithm (DSA) with 256-bit secure hash algorithm (SHA-256), Rivest-Shamir-Adleman (RSA) algorithm, 128-bit advanced encryption standard (AES-128) algorithm, in cipher block chaining (CBC) mode, elliptic curve digital signature algorithm (ECDSA), ES-DH, AES-256, etc. If the electric vehicle 102 and the charging stations 106, 108, and 110 support the encryption protocols (and hence the secure association procedure), the association unit 112 can determine that the secure association procedure should be executed. In some embodiments, if even one of the charging stations does not support the secure association procedure, the association unit 112 can determine that the secure association procedure should not be executed. If it is determined that operations for the secure association procedure should be executed, the flow continues at block 212. Otherwise, the flow continues at block 214 in FIG. 3.

At block 212, in response to determining that operations for the secure association procedure should be executed, security information associated with the client network device is provided to the service providers. With reference to the example of FIG. 1, if the association unit 112 determines, based on the received communication parameters response messages (e.g., the CM_SLAC_PARM.CNF messages) that the secure association procedure should be executed, the association unit 112 can transmit security information associated with the electric vehicle 102 (e.g., in a CM_PKC- S_CERT.IND message) to the charging stations 106, 108, and 110. In some embodiments, the security information associated with the electric vehicle 102 can comprise a public key certificate (associated with the electric vehicle 102) that can be used for transport layer security. The security information can also indicate the length of the public key certificate, a cipher suite of the public key certificate, an address (e.g., a MAC address) of the electric vehicle 102, etc. In some embodiments, the public key certificate associated with the electric vehicle 102 can be an X.509v3 certificate. The public key certificate can be provided to the charging stations 106, 108, and 110 as a signed Cryptographic Message Syntax (CMS) message (e.g., in accordance with IETF RFC 5652) with null content and attached certificate list, and certificate revocation lists (CRLs). The public key certificate associated with the electric vehicle 102 may be signed by a certificate authority (CA) authorized to issue electric vehicle certificates. The public key certificate associated with the electric vehicle 102 may have one or more attributes that identify the certificate holder (i.e., the electric vehicle 102) as a legitimate electric vehicle. Furthermore, the certificate authority that signed the electric vehicle's certificate may be authorized to vouch for the electric vehicle's identity. In some embodiments, the security information associated with the electric vehicle 102 can be transmitted a predetermined number of times. In another embodiment, the security information associated with the electric vehicle 102 can be transmitted until the electric vehicle 102 (e.g., the association unit 112) receives an acknowledgement message from the charging stations 106, 108, and 110 (e.g., all the charging stations that responded with their communication parameters). Furthermore, in some embodiments, the security information associated with the electric vehicle 102 can be transmitted using multi-network broadcast (MNBC) communication.

In some embodiments, in addition to transmitting the security information associated with the electric vehicle 102 to the charging stations 106, 108, and 110, the electric vehicle 102 (e.g., the association unit 112) may also receive security information (e.g., public key certificates) associated with each of the charging stations 106, 108, and 110. All public key certificates received by the electric vehicle 102 can be validated (e.g., in accordance with Section 9 of ZigBee-11185r05) before associating the public key with the identity and attributes of the certificate. For example, the electric vehicle 102 can verify the attributes indicated in the public key certificate to validate the charging station 106 that transmitted the public key certificate. The electric vehicle 102 can keep track of public keys for the root CAs that are authorized to vouch for the legitimacy of the charging stations 106, 108, and 110. After the security information is exchanged, subsequent messages transmitted from the electric vehicle 102 to the charging stations 106, 108, and 110 may be signed and/or encrypted. In some embodiments, to sign and encrypt the messages, the electric vehicle 102 (e.g., the association unit 112) may sign the content first and then encrypt the signed content. In other words, the outer content type may be encrypted data, and the inner content type may be the signed data. The flow continues at block 214 in FIG. 3.

At block 214, one or more service matching messages are broadcast to the service providers based, at least in part, on the received communication parameters. For example, the association unit 112 can analyze the received communication parameters to determine how many service matching messages should be broadcast. For example, the communication parameters received from the charging stations 106, 108, and 110 can indicate that 5, 8, and 10 service matching messages should be transmitted to the charging stations 106, 108, and 110 respectively. Accordingly, the association unit 112 may determine to broadcast 10 service matching messages. In some embodiments, prior to transmitting the service matching messages, the association unit 112 can transmit an association initiation message (e.g., a CM_START_ATTEN_CHAR.IND message) to notify the charging stations 106, 108, and 110 that the association procedure will start. The association initiation message may be a multi-network broadcast message. In some embodiments, the association unit 112 may transmit the association initiation message a predetermined number of times (e.g., three times) to ensure that all the charging stations 106, 108, and 110 receive the association initiation message. If the association unit 112 determined that the secure association procedure should be executed, the association unit 112 can encrypt the association initiation messages prior to transmitting the association initiation messages. Additionally, the association initiation messages can also indicate the communication parameters in accordance with which the association procedure will be executed. For example, the association initiation messages can indicate a number of service matching messages that will be transmitted (e.g., 10 service matching messages with reference to the above example), a maximum time interval during which the service matching messages will be transmitted, an identifier of the electric vehicle, to whom the attenuation information should be transmitted, etc.

The association unit 112 can then broadcast the service matching messages (e.g., CM_MNBC_SOUND.IND messages) to the charging stations 106, 108, and 110. In some embodiments, the service matching messages can be multi-network broadcast messages. As described above, the number of service matching messages that are transmitted may be based on the communication parameters received from the charging stations 106, 108, and 110. The service matching messages can comprise an identifier (e.g., a vehicle identifier (VIN)) of the electric vehicle, a number of remaining service matching messages that will be transmitted, and other suitable information. It is noted that if the electric vehicle 102 is configured to execute the secure association procedure with the charging stations 106, 108, and 110, the association unit 112 can encrypt/sign the service matching messages with the public key signature of the electric vehicle 102, prior to transmitting the service matching messages. The flow continues at block 216.

At block 216, attenuation information is received from one or more service providers in response to the broadcasting the service matching messages to the service providers. In some embodiments, after the association unit 112 transmits all the service matching messages to the charging stations 106, 108, and 110 (and/or after the time interval for transmitting the service matching messages elapses), the association unit 112 can start another timer for receiving the attenuation information from the charging stations 106, 108, and 110. With reference to the example of FIG. 1, the association unit 112 can receive attenuation information (e.g., in a CM_ATTEN_CHAR.IND message) from one or more charging stations 106, 108, and 110. Operations of the charging stations 106, 108, and 110 for determining the attenuation information will further be described below with reference to FIGS. 4-5. When the association unit 112 receives the attenuation information from a charging station (e.g., the charging station 106) in an appropriate message, the electric vehicle 102 can verify the authenticity of the received message by determining whether a charging station identifier received with the attenuation information matches a previously received charging station identifier. If the electric vehicle 102 is configured to execute the secure association procedure with the charging station 106, the association unit 112 can also verify the signature on the received message. The association unit 112 can discard the message including the received attenuation information if the charging station identifier does not match a previously received charging station identifier or if the signature indicates that the message was not from an authorized charging station or was a replay.

In some embodiments, in response to receiving the attenuation information from the charging station 106, the association unit 112 may transmit an acknowledgement message (e.g., a CM_ATTEN_CHAR.RSP message) to the charging station 106. The acknowledgement message may be signed/encrypted if the electric vehicle 102 and the charging station 106 are configured to execute the secure association procedure. In some embodiments, as will be further described below, the association unit 112 can select the matched charging station after the time interval for receiving the attenuation information elapses. If (after the time interval elapses) the association unit 112 has not received the attenuation information from any of the charging stations 106, 108, and 110, the association unit 112 can restart the association procedure by rebroadcasting the communication parameters request message. The flow continues at block 218.

At block 218, the client network device analyses the received attenuation information and selects one of the service providers with which to associate. With reference to the example of FIG. 1, the association unit 112 can analyze the attenuation information messages (e.g., the CM_ATTN_CHAR.IND message) received from one or more charging stations 106, 108, and 110. Based on this analysis, the association unit 112 can determine the charging station ("matched charging station") to which the electric vehicle 102 is connected though the charging cordset. In using the attenuation information received from the charging stations 106, 108, and 110 to identify the matched charging station, it is assumed that the charging station 106 that is directly connected to the electric vehicle 102 (e.g., via the charging cordset) will receive the service matching messages from the electric vehicle 102 with minimal attenuation. For any other charging station 108, 110 (that is not directly connected to the electric vehicle 102) to receive the service matching messages, the service matching messages would have to pass through multiple open contacts (e.g., switches) and/or PLC pass band (RF) coupling, which can significantly reduce the signal strength (i.e., increase the attenuation) measured by the other charging stations 108, 110. The association unit 112 of the electric vehicle 102 can exploit the inherent asymmetry in signal strength at different charging stations to associate (match) the electric vehicle with the charging station to which it is physically connected through the charging cordset. In other words, the charging station 106 that is directly connected to the electric vehicle 102 will detect the highest signal level for a received signal (or the lowest attenuation level for a received signal). Accordingly, in some embodiments, the matched charging station can be selected as one of the charging stations 106 that is associated with the lowest attenuation level (or the highest signal level). In some embodiments, the electric vehicle 102 can determine the matched charging station based on attenuation information received from one or more charging stations 106, 108, and 110 and based on the electric vehicle's local signal level measurements of transmissions received from the charging stations 106, 108, and 110. The association unit 112 of the electric vehicle 102 can combine the attenuation information received from the charging stations 106, 108, and 110 with the attenuation information measured by the electric vehicle 102 to make the proper association decision (i.e., to determine the matched charging station). The flow continues at block 220.

At block 220, the selected service provider is notified to associate with the client network device. With reference to the example of FIG. 1, the association unit 112 of the electric vehicle 102 can transmit a match notification message (e.g., a CM_SLAC_MATCH.REQ message) to notify the charging station 106 that the charging station 106 was identified as the matched charging station for the electric vehicle 102 and that the electric vehicle 102 is connected to the matched charging station 106. The match notification message may or may not be signed/encrypted with the electric vehicle's encryption key depending on whether the secure association procedure was executed. The match notification message can comprise an identifier (e.g., VIN) of the electric vehicle 102, a MAC address of the electric vehicle 102, an identifier of the matched charging station 106, a MAC address of the matched charging station 106, etc. In addition, the association unit 112 can also transmit the match notification message as a request for the network connection parameters (e.g., a network identifier (NID), a network membership key (NMK), etc.) from the matched charging station 106. The association unit 112 may re-transmit the match notification message a predetermined number of times if a match confirmation message is not received within a predetermined time interval. In some embodiments, the match notification message can be a multi-network broadcast message. The flow continues at block 222.

At block 222, the client network device associates with the selected service provider and receives the service from the selected service provider. With reference to the example of FIG. 1, the association unit 112 can receive the network connection parameters (e.g., the NID and the NMK) from the matched charging station 106, as will be further described below in FIG. 5. The association unit 112 can then configure the electric vehicle 102 using the received network connection parameters. Likewise, the matched charging station 106 can also be configured (as will be described below in FIG. 5) using the network connection parameters. The electric vehicle 102 and the matched charging station 106 can then form an AVLN using the common NID and the common NMK. It is noted that if the electric vehicle 102 and the matched charging station 106 are configured to execute the secure association procedure, then in response to receiving the match confirmation message including the network connection parameters, the association unit 112 can verify the charging station identifier and the public key signature associated with the matched charging station 106. The electric vehicle 102 can associate with the matched charging station 106 if the charging station identifier and the public key signature are verified. From block 222, the flow ends.

Figure 4:
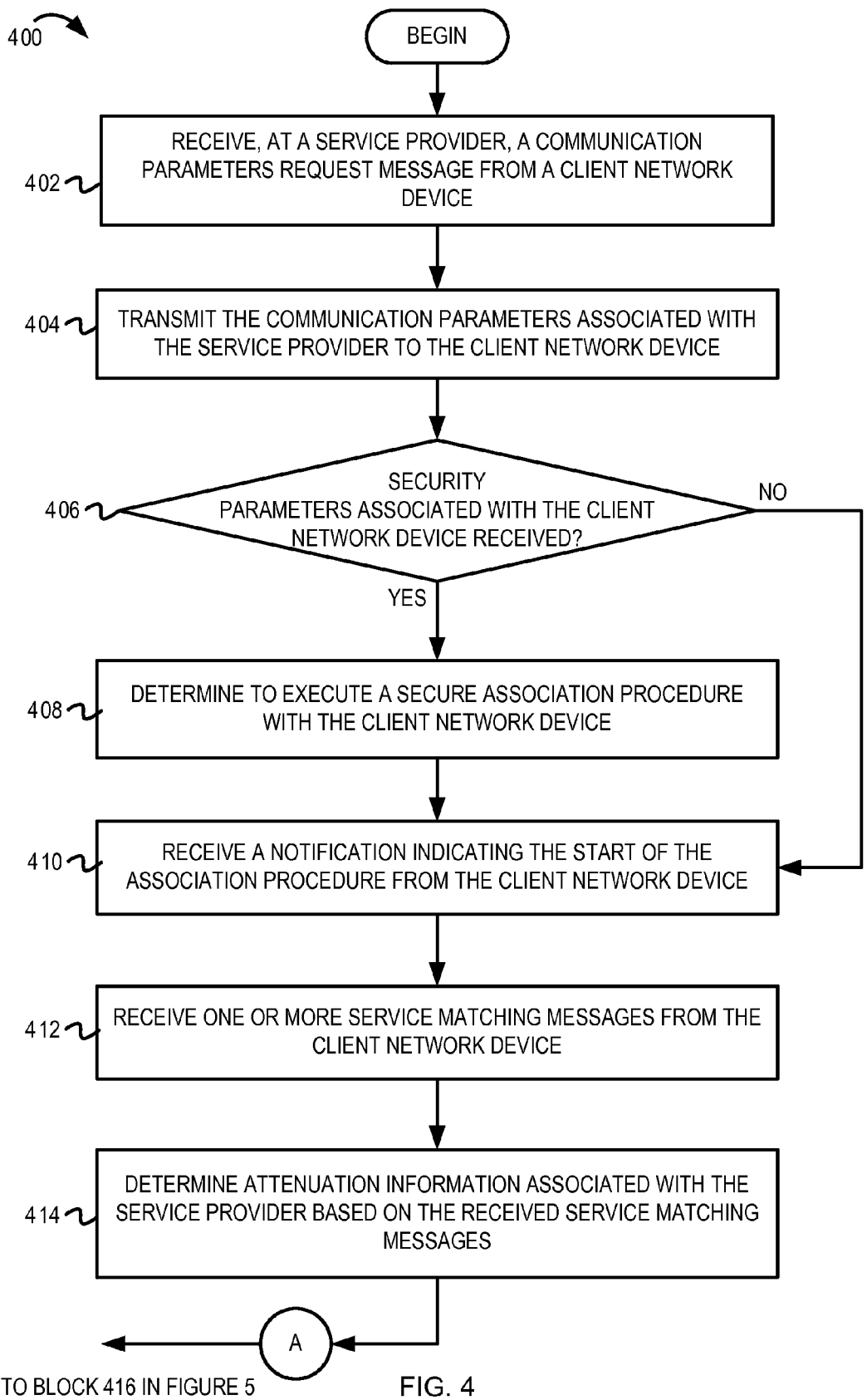
FIG. 4 is a flow diagram illustrating example operations of a service provider executing an association procedure with a client network device.
Figure 5:
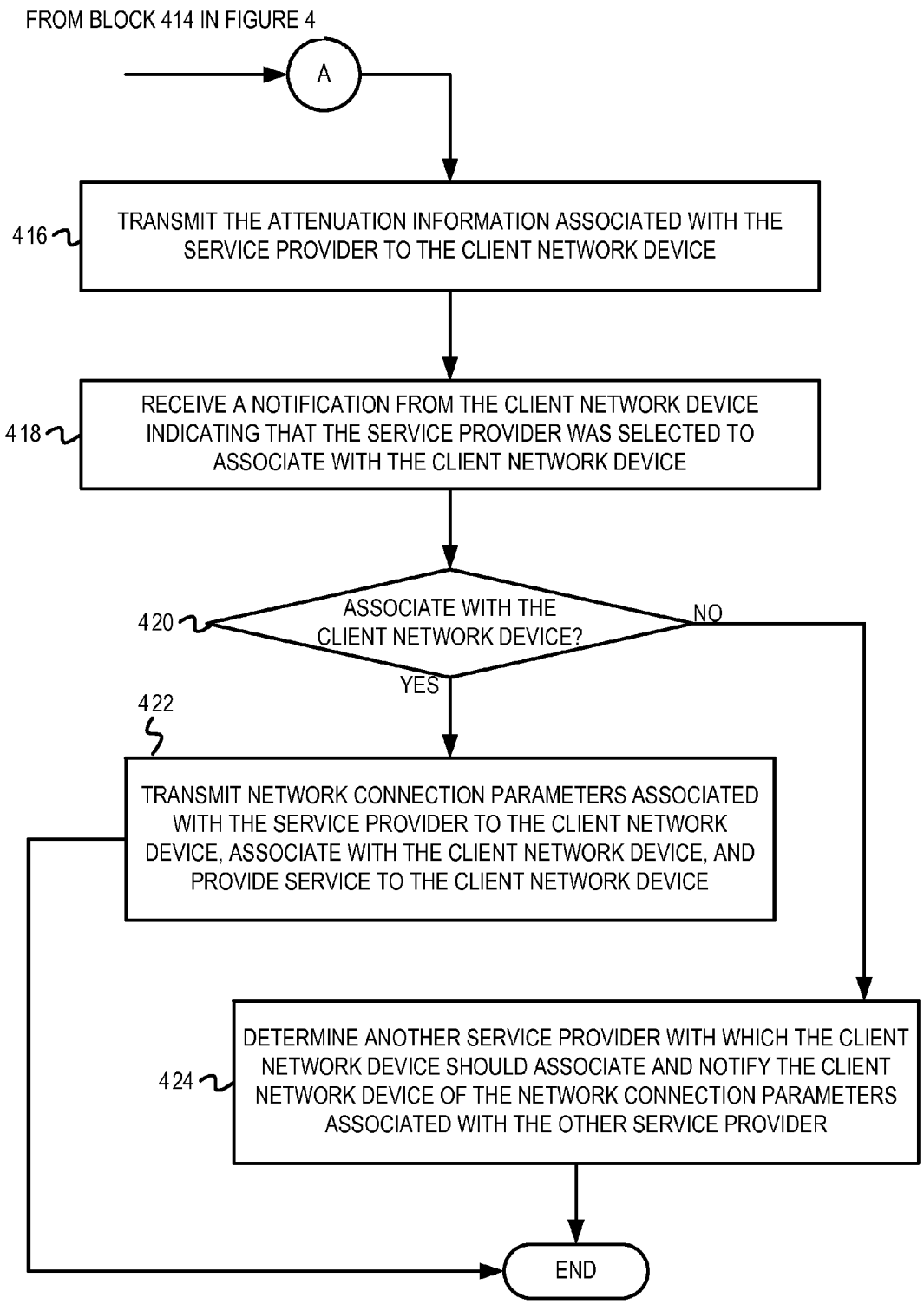
FIG. 5 is a continuation of FIG. 4 and also illustrates example operations of the service provider executing the association procedure with the client network device.

FIG. 4 and FIG. 5 depict a flow diagram 400 illustrating example operations of a service provider executing an association procedure with a client network device. The flow 400 begins at block 402 in FIG. 4. It is noted that FIGS. 4-5 will be described below using example messages and framework of the SLAC procedure of the HomePlug Green PHY specification.

At block 402, a service provider receives a communication parameters request message from a client network device. In some embodiments, the client network device can be a plug-in electric vehicle (PEV); while the service provider can be an electric vehicle supply equipment (EVSE) also referred to as a charging station. With reference to the example of FIG. 1, in some embodiments, prior to receiving the communication parameters request message, the association unit 116 of the charging station 106 may determine that the charging station 106 is connected to an electric vehicle 102 using a charging cordset. Accordingly, the association unit 116 can configure the charging station 106 in a master operating mode and can configure the charging station 106 to support association procedures with the electric vehicle 102. As described above with reference to FIG. 2, in addition to a request for communication parameters associated with the charging station, the communication parameters request message can comprise an identifier of the electric vehicle 102, an indication of whether the electric vehicle 102 supports a secure association procedure, etc. The flow continues at block 404.

At block 404, the communication parameters associated with the service provider are transmitted to the client network device. With reference to the example of FIG. 1, the association unit 116 of the charging station 106 can transmit the communication parameters associated with the charging station 106 to the electric vehicle 102. In one embodiment, the association unit 116 can transmit a communication parameters response message (e.g., a CM_SLAC_PARM.CNF message) including the communication parameters associated with the charging station 106. The communication parameters response message can comprise an identifier of the charging station 106, the identifier of the electric vehicle 102, an indication of whether the charging station 106 supports the secure association procedure, etc. The communication parameters response message can also comprise the communication parameters including a number of service matching messages that should be transmitted to the charging station 106, a maximum time interval within which the service matching messages should be transmitted to the charging station 106, etc. In some embodiments, the number of service matching messages requested by the charging station 106 may based on the network configuration and the position of the charging station 106 relative to other charging stations (and network devices). For example, if the charging station 106 is operating in a noisy environment, the association unit 116 (of the charging station 106) may indicate that a large number of service matching messages should be transmitted to the charging station 106. Alternately, if the charging station 106 is operating in a relatively noise-free environment, the association unit 116 may indicate that a smaller number of service matching messages should be transmitted to the charging station 106. Receiving a larger number of service matching messages in the noisy environment can help the association unit 116 average out the effect of noise on the attenuation measurements. In some embodiments, the number of service matching messages requested by the charging station 106 may based on the number of electric vehicles that can be supported (e.g., for charging) at the charging station 106. Thus, if the charging station 106 is configured to support charging for multiple electric vehicles, the charging station 106 may require a larger number of service matching messages to determine whether the electric vehicle 102 is connected to the charging station and (if so) to which charging slot the electric vehicle 102 is connected. For example, if the charging station 106 comprises two charging ports (that can be used to charge two electric vehicles), the association unit 116 may indicate that the electric vehicle 102 should broadcast, for example, 30 service matching messages to the charging station 106. In this example, the association unit 116 can then utilize the first 15 service matching messages to determine whether the electric vehicle 102 is connected to the first charging port of the charging station 106 and can utilize the remaining 15 service matching messages to determine whether the electric vehicle 102 is connected to the second charging port of the charging station 106. In addition, the association unit 116 can indicate (in the communication parameters response message) whether the charging station 106 supports the secure association procedure. In some embodiments, if the charging station 106 supports the secure association procedure, the charging station 106 can support one or more encryption protocols such as DSA with SHA-256, RSA, AES-128 in CBC mode, ECDSA, ES-DH, AES-256, etc. In some embodiments, the communication parameters response message including the communication parameters can be transmitted using a multi-network broadcast message. The flow continues at block 406.

At block 406, it is determined whether security information associated with the client network device was received at the service provider. As described above, as part of the communication parameters request message, the electric vehicle 102 can indicate whether it (i.e., the electric vehicle 102) supports the secure association procedure. Likewise, as part of the communication parameters response message, the association unit 116 can indicate whether the charging station 106 supports the secure association procedure. If the electric vehicle 102 and all the charging stations 106, 108, and 110 (that communicate with the electric vehicle 102) support the secure association procedure, the electric vehicle 102 can transmit its security information to the charging stations 106, 108, and 110. For example, the association unit 116 may receive (from the electric vehicle 102) a public key certificate associated with the electric vehicle 102, as described above in block 210 of FIG. 2. If it is determined that the security information associated with the client network device was received, the flow continues at block 408. Otherwise, if it is determined that the security information associated with the client network device was not received, the service provider determines to execute an unsecure association procedure with the client network device, and the flow continues at block 410.

At block 408, the service provider determines to execute a secure association procedure with the client network device. In response to determining that the security information (e.g., a public key certificate) was received from the electric vehicle 102, the association unit 116 of the charging station 106 can determine to execute the secure association procedure with the electric vehicle 102. In some embodiments, the association unit 116 can validate the public key certificate received from the electric vehicle 102 (e.g., in accordance with RFC 5258) before associating the public key with the identity and attributes of the certificate. For example, the association unit 116 can verify the attributes indicated in the received public key certificate to validate the authenticity of the electric vehicle 102 that transmitted the public key certificate. After the electric vehicle 102 is validated, the association unit 116 can store the received public key certificate associated with the electric vehicle 102 for verifying signed/encrypted communications (e.g., service matching messages) subsequently received from the electric vehicle 102. The charging station 106 can also keep track of public keys for the root CAs that are authorized to vouch for the legitimacy of the electric vehicle 102.

In some embodiments, in response to determining to execute the secure association procedure with the electric vehicle 102, the association unit 116 (of the charging station 106) can also transmit security information associated with the charging station 106 (e.g., in a CM_PKCS_CERT.IND message) to the electric vehicle 102. In some embodiments, the security information of the charging station 106 can comprise a public key certificate (associated with the charging station 106) that can be used for transport layer security. The security information can also indicate the length of the public key certificate, a cipher suite of the public key certificate, an address (e.g., a MAC address) of the charging station 106, etc. In some embodiments, the public key certificate associated with the charging station 106 can be an X.509v3 certificate. The public key certificate can be provided to the electric vehicle 102 as a signed CMS message (e.g., in accordance with RFC 5652) with null content and attached certificate list, and CRLs. The public key certificate associated with the charging station 106 may be signed by a CA authorized to issue charging station certificates. The public key certificate associated with the charging station 106 may have one or more attributes that identify the certificate holder (i.e., the charging station 106) as a legitimate charging station. Furthermore, the certificate authority that signed the charging station's certificate may be authorized to vouch for the charging station's identity. In some embodiments, the security information associated with the charging station 106 can be transmitted a predetermined number of times. In another embodiment, the security information associated with the charging station 106 can be transmitted until the charging station 106 (e.g., the association unit 116) receives an acknowledgement message (e.g., a CM_PKCS_CERT.RSP message) from the electric vehicle 102. Furthermore, in some embodiments, the security information associated with the charging station 106 can be transmitted using multi-network broadcast (MNBC) communication. In some embodiments, if the security information associated with the charging station 106 cannot be transmitted in a single message (e.g., because the length of the message is greater than the maximum permissible message length), the message can be fragmented. The flow continues at block 410.

At block 410, a notification indicating the start of the association procedure ("association initiation message") is received from the client network device. For example, the association unit 116 of the charging station 106 can receive a broadcast message (e.g., a MNBC message) indicating that the association procedure will begin. In addition, the association initiation message (e.g., a CM_START_ATTEN_CHAR.IND message) can also comprise a time out value that indicates for how the electric vehicle 102 will transmit the service matching messages. In response to receiving the association initiation message, the association unit 116 of the charging station 106 can start a timer (that comprises the time out value received in the association initiation message) and can wait to receive a predetermined number of service matching messages from the electric vehicle 102. As will be further described below, the association unit 116 can transmit attenuation information associated with the charging station 106 after the timer elapses. It is also noted that the association initiation message may or may not be signed by the electric vehicle 102 depending on whether or not the electric vehicle 102 and the charging station 106 are configured to execute the secure association procedure. The flow continues at block 412.

At block 412, one or more service matching messages are received from the client network device. With reference to the example of FIG. 1, in some embodiments, the association unit 116 can compare an electric vehicle identifier received in the service matching message with a previously received electric vehicle identifier (e.g., received in the communication parameters request message) to determine whether the service matching message was received from a legitimate electric vehicle and to minimize the possibility of replay attacks by a rouge electric vehicle. Additionally, the association unit 116 may also determine whether a counter value of the received service matching message is less than a counter value of a previously received service matching message. In some embodiments, if the electric vehicle 102 and the charging station 106 are configured to execute the secure association procedure, the association unit 116 can determine whether the electric vehicle's public key signature in each received service matching message is valid to ensure that the service matching message was received from a legitimate electric vehicle. The association unit 116 can terminate the association procedure if the received service matching messages are not valid. After the service matching messages are received (and if the received service matching messages are valid), the flow continues at block 414.

At block 414, attenuation information associated with the service provider is determined based on the received service matching messages. With reference to the example of FIG. 1, the association unit 116 of the charging station 106 can process the received service matching messages and can generate attenuation information (or signal level attenuation information) based on the received service matching messages. In some embodiments, the attenuation information can comprise the attenuation profile between the electric vehicle 102 (that transmitted the service matching messages) and the charging station 106. In some embodiments, a set of unmasked frequency carriers of the PLC communication band can be divided into groups of a predetermined number of frequency carriers (e.g., sixteen frequency carriers per group), starting with the frequency carrier at the lowest frequency. For each group of carriers, the average attenuation of the group of carriers can be determined. It is noted that if a group has less than the predetermined number of frequency carriers, the average attenuation of the group can be determined based on the available unmasked frequency carriers within the group. In some embodiments, the attenuation profile associated with each service matching message and each frequency carrier can be determined. The average attenuation for a group of carriers and a predetermined number of service matching messages can then be calculated based on the attenuation profile associated with each service matching message and each frequency carrier associated with the group. The flow continues at block 416 in FIG. 5.

At block 416, the attenuation information associated with the service provider is transmitted to the client network device. In some embodiments, the association unit 116 can transmit the attenuation information in a response message (e.g., a CM_ATTEN_CHAR.IND message) to the electric vehicle 102 as soon as the association unit 116 receives and processes a predetermined number of service matching messages (indicated by the association unit 116 as part of the communication parameters). In another embodiment, the association unit 116 can transmit the attenuation information to the electric vehicle 102 after the last service matching message (e.g., with a "0" count value) is received and analyzed. In another embodiment, the association unit 116 can transmit the attenuation information to the electric vehicle 102 after a predetermined time interval allocated for receiving the service matching messages elapses. The response message can comprise an address (e.g., a MAC address) of the electric vehicle 102, an identifier (e.g., VIN) of the electric vehicle 102, an identifier of the charging station 106, and the attenuation information (or signal level information) associated with the charging station 106. In some embodiments, as part of the attenuation information, the association unit 116 can indicate the number of groups into which the frequency carriers were divided and an average attenuation level associated with each group of frequency carriers. In some embodiments, the response message including the attenuation information may be a multi-network broadcast message. It is noted that if the electric vehicle 102 and the charging station 106 are configured to execute the secure association procedure, the association unit 116 may sign the response message including the attenuation information using the public key certificate of the charging station 106. In some embodiments, to ensure reliable reception of the attenuation information at the electric vehicle 102, the association unit 116 may retransmit the response message including the attenuation information to the electric vehicle 102 until an acknowledgement message is received from the electric vehicle 102. The flow continues at block 418.

At block 418, a notification is received from the client network device indicating that the service provider was selected to associate with the client network device. For example, the association unit 116 of the charging station 106 can receive a match notification message (described above in block 320 of FIG. 3) that indicates that the electric vehicle 102 selected the charging station 106 as the matched charging station and that the electric vehicle wishes to associate with (and receive electric power from) the charging station 106. The flow continues at block 420.

At block 420, the service provider determines whether to associate with the client network device. For example, the association unit 116 can determine whether the charging station 106 should associate with and establish a communication link with the electric vehicle 102. In some embodiments, the association unit 116 (of the charging station 106) can receive attenuation information associated with other charging stations 108 and 110 (with which the electric vehicle 102 is communicating). The association unit 116 can analyze the attenuation information associated with the charging stations 106, 108, and 110 and can identify the charging station with which the electric vehicle 102 should associate ("expected matched charging station"). If the charging station 106 is the expected matched charging station, the association unit 116 can determine that the charging station 106 should associate with the electric vehicle 102. If the charging station 106 is not the expected matched charging station, the association unit 116 can determine that the charging station 106 should not associate with the electric vehicle 102. As another example, in response to receiving the match notification message, the association unit 116 can determine whether the charging station 106 it is connected to the electric vehicle 102 (e.g., via a charging cordset). If the association unit 116 determines that the charging station 106 is connected to the electric vehicle 102, the association unit 116 can determine that the charging station 106 should associate with the electric vehicle 102. If the association unit 116 determines that the charging station 106 is not connected to the electric vehicle 102, the association unit 116 can determine that the charging station 106 should not associate with the electric vehicle 102. If it is determined that the service provider should associate with the client network device, the flow continues at block 422. Otherwise, if it is determined that the service provider should not associate with the client network device, the flow continues at block 424.

At block 422, the service provider transmits its network connection parameters to the client network device, associates with the client network device, and provides service to the client network device. After determining to associate with the electric vehicle 102 at block 420, the association unit 116 of the charging station 106 can transmit a match confirmation message (e.g., a CM_SLAC_MATCH.CNF message) to the electric vehicle 102. The match confirmation message can comprise an identifier (e.g., VIN) of the electric vehicle 102, a MAC address of the electric vehicle 102, an identifier of the matched charging station 106, a MAC address of the matched charging station 106, and one or more network connection parameters associated with a network of the matched charging station 106. For example, if the charging station 106 is configured in accordance with the HomePlug Green PHY specification, the association unit 116 can transmit a network identifier (NID) and a network membership key (NMK) associated with a network of the matched charging station 106 in the match confirmation message. If the charging station 106 and the electric vehicle 102 are configured to execute the secure association procedure, the network connection parameters (e.g., the NID and the NMK) and the match confirmation message can be signed using the charging station's public key certificate and can be encrypted using the electric vehicle's public encryption key. Sequence numbers or nonces associated with the session can be used to prevent replay attacks. The association unit 116 can transmit the match confirmation message using multi-network broadcast communication. It is noted that in some embodiments, prior to transmitting the match confirmation message, the association unit 116 may also validate that the electric vehicle 102 is connected to the charging station 106 via a charging cordset using a validation process that will be further described below.

In addition to transmitting the network connection parameters to the electric vehicle 102, the charging station 106 can also configure itself (e.g., the HLE of the charging station 106 can configure the Green PHY module of the charging station 106) with the same network connection parameters (e.g., the NID and NMK). This can cause the charging station 106 to become an unassociated station waiting for another station that has the same network connection parameters. Once the charging station 106 and the electric vehicle 102 are configured using the same network connection parameters (e.g., NID and NMK), the charging station 106 and the electric vehicle 102 can form an AV logical network (AVLN). It is noted that the charging station 106 may ignore/discard any communication parameter request messages received from other electric vehicles as long as the electric vehicle 102 is associated with the charging station (e.g., as long as the charging station 106 and the electric vehicle 102 are part of the same AVLN). After the electric vehicle 102 joins the network of the matched charging station 106, the matched charging station 106 (e.g., an authentication unit of the matched charging station 106) can execute appropriate application layer authentication and authorization procedures with the electric vehicle 102. After the electric vehicle 102 has been successfully authenticated/authorized, the matched charging station 106 (e.g., a charging unit of the matched charging station 106) can close its power relays and supply electric power to the electric vehicle 102. From block 422, the flow ends.

At block 424, another service provider with which the client network device should associate is identified and the client network device is notified of the network connection parameters associated with the other service provider. As discussed above in block 420, the association unit 116 may determine that the charging station 106 is not the expected matched charging station and that the electric vehicle 102 should associate with another charging station (e.g., the charging station 110). Accordingly, the association unit 116 can determine network connection parameters (e.g., NID, NMK, MAC address, etc.) associated with the expected matched charging station 110. The association unit 116 can override the electric vehicle's association decision, provide the network connection parameters associated with the expected matched charging station 110 to the electric vehicle 102, and prompt the electric vehicle 102 to associate with the expected matched charging station 110. From block 424, the flow ends.

It should be noted that although FIG. 5 describes the association unit 116 transmitting the network connection parameters associated with the charging station 106 to enable the electric vehicle 102 to associate with the charging station 106

(at block 422 of FIG. 5), embodiments are not so limited. In other embodiments, the association unit 112 of the electric vehicle 102 can transmit network connection parameters associated with the electric vehicle 102, to enable the charging station 106 to associate with the electric vehicle 102. In other embodiments, other suitable techniques can be employed to enable the electric vehicle 102 to associate with the matched charging station 106. Also, although FIG. 5 describes the association unit 116 (of the charging station 106) receiving a match notification message from the electric vehicle 102, determining that the electric vehicle 102 should associate with another charging station 110, and providing the network connection parameters associated with the other charging station 110, embodiments are not so limited. In other embodiments, if the association unit 116 that receives the match notification message determines that the electric vehicle 102 should associate with another charging station (or that the charging station 106 is not connected to the electric vehicle 102), the association unit 116 can simply notify the electric vehicle 102 to re-execute the association procedure (e.g., to re-broadcast the communication parameters request message of block 202 in FIG. 2).

It should be understood that FIGS. 1-5 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. In some embodiments, the electric vehicle 102 may employ a reduced transmit power level during the association procedure to minimize the number of charging stations that receive transmissions from the electric vehicle 102. In one implementation, the association unit 112 of the electric vehicle 102 can initiate the association procedure (e.g., by transmitting the communication parameters request message at block 204 of FIG. 2) at a lowest transmit power level to reduce the number of charging stations that respond to the communication parameters request message and to minimize the possibility of receiving communications from charging stations to which the electric vehicle 102 is not connected. For example, the association unit 112 may start transmitting the communication parameters request message at a transmit power level that is 25 dB below the maximum transmit power level of the electric vehicle 102. If the association unit 112 does not receive a communication parameters response message from any of the charging stations, the association unit 112 can increase the transmit power level by, for example, 2 dB. If the association unit 112 still does not receive the communication parameters response message from any of the charging stations, the association unit 112 can increase the transmit power level again (e.g., by 2 dB or another transmit power increment). This process of incrementally and iteratively increasing the transmit power level can continue until the association unit 112 receives a communication parameters response message including the communication parameters from at least one charging station 106. The association unit 112 may continue to communicate with the charging station 106 using the lowest transmit power level at which the communication parameters response message was successfully received. In another implementation, the association unit 112 of the electric vehicle 102 can transmit the communication parameters request message (at block 204 of FIG. 2) at a normal (or maximum) transmit power level and can receive communication parameters from some/all of the charging stations. The association unit 112 can then transmit a set of service matching messages at a lowest transmit power level to reduce the number of charging stations that respond to the service matching messages. If the association unit 112 does not receive a response (e.g., attenuation information) to the first set of service matching messages from any of the charging stations, the association unit 112 can increase the transmit power level and transmit a second set of service matching messages at a higher transmit power level. The association unit 112 can incrementally and iteratively increase the transmit power level until the association unit 112 receives a response from at least one charging station.

It should be noted that in some embodiments, the length of the service matching message can be larger than a maximum packet length permitted for transmission ("permissible maximum packet length") in the communication network. For example, the permissible maximum packet length may be 502 octets. In some embodiments, the length of the service matching message may be greater than 502 octets. In this embodiment, the association unit 112 of the electric vehicle 102 can fragment the service matching message so that the length of each fragment is less than or equal to the permissible maximum packet length. The association unit 112 can transmit the fragments of the service matching message to the charging stations 106, 108, and 110.

Although the Figures depict the charging stations 106, 108, and 110 transmitting their respective attenuation information to the electric vehicle 102 and the electric vehicle 102 selecting the matched charging station 106, embodiments are not so limited. In some embodiments, the charging stations can coordinate to determine the matched charging station 106 for the electric vehicle 102. For example, the charging stations 106, 108, and 110 can exchange their respective attenuation information and can determine the matched charging station 106 for the electric vehicle 102. In other embodiments, one of the charging stations 106, 108, and 110 may be designated as a "master charging station" (e.g., the charging station 110). The master charging station 110 may receive the attenuation information from the other charging stations 106 and 108, may select the matched charging station 106, and may notify the electric vehicle 102 and the matched charging station 106 to associate with each other and establish a communication link. In these embodiments, the charging stations 106, 108, and 110 may not provide their respective attenuation information to the electric vehicle 102. Instead, one of the charging stations (e.g., the matched charging station 106 or another "master" charging station 110) may simply notify the electric vehicle 102 of the association decision (i.e., the matched charging station). In other embodiments, the charging stations 108, and 110 can transmit their respective attenuation information to another network device (e.g., a central coordinator device). The network device (e.g., the central coordinator device) that receives the attenuation information associated with all the charging stations 106, 108, and 110 can analyze the attenuation information, select a matched charging station 106 for the electric vehicle 102, and notify the electric vehicle 102 and the matched charging station 106 accordingly.

Furthermore, in some embodiments, the association unit 112 of the electric vehicle 102 may select the matched charging station 106 from a subset of the charging stations that provide their attenuation information to the electric vehicle 102. The association unit 112 can identify a subset of charging stations that are associated with an attenuation level that is less than a threshold attenuation level (or a signal level that is greater than a threshold signal level). For example, the association unit 112 may receive attenuation information from the charging stations 106, 108, and 110. The association unit 112 may determine that the charging stations 106 and 108 are associated with an attenuation level that is less than the threshold attenuation level (for example, a 25 dB threshold attenuation level). The association unit 112 can then select either the charging station 106 or the charging station 108 as the matched charging station. It is noted that if none of the charging stations meet the threshold attenuation level, the association unit 112 can restart the association procedure by rebroadcasting the communication parameters request message (as described above in block 202 of FIG. 2) or can indicate failure of the association procedure (e.g., an inability to receive power from any of the charging stations).

In some embodiments, each charging station 106, 108, and 110 that receives the service matching messages from the electric vehicle 102 can determine whether to transmit their respective attenuation information to the electric vehicle 102. For example, the association unit 116 of the charging station 106 can determine the attenuation level associated with the charging station 106 (e.g., based on the received service matching messages). The association unit 116 can determine whether the attenuation level associated with the charging station 106 lies below a threshold attenuation level. The threshold attenuation level may be predetermined and may be calculated based on the expected attenuation of a signal received from the electric vehicle to which the charging station is directly connected. If the attenuation level associated with the charging station 106 is below the threshold attenuation level, the association unit 116 may automatically determine that the charging station 106 it is not directly connected to the electric vehicle 102. Accordingly, the association unit 116 may not transmit the attenuation information associated with the charging station 106 to the electric vehicle 102.

In some embodiments, the matched charging station 106 (e.g., the association unit 116) may also transmit an amplitude map associated with the matched charging station 106 to the electric vehicle 102 (e.g., in a CM_AMP_MAP.REQ message). The electric vehicle 102 (e.g., the association unit 112) may also optionally provide the amplitude map associated with the electric vehicle 102 to the matched charging station 106 (e.g., in a CM_AMP_MAP.CNF message). The electric vehicle 102 and the matched charging station 106 can use the amplitude maps (of the electric vehicle 102 and the matched charging station 106) to determine the transmit power level that should be used for communication. The electric vehicle 102 and the matched charging station 106 can use the amplitude maps to adjust the amplitude of each unmasked carrier of the communication band (e.g., a powerline communication band) for all subsequent communications between the electric vehicle 102 and the matched charging station 106. The amplitude maps can enable the electric vehicle 102 and the matched charging station 106 to determine a transmit amplitude reduction for each unmasked carrier (beginning at the lowest frequency carrier). For example, the transmit power level that is used (e.g., by the electric vehicle 102 and the matched charging station 106) on various carrier frequencies may be based on the minimum of the charging station's amplitude map and the electric vehicle's amplitude map. This can take into consideration any uncertainty/sensitivity to specific PLC carrier frequencies (at the electric vehicle and/or the matched charging station).

It is noted that the charging stations and the electric vehicle can form a network using various suitable techniques. In some embodiments, the electric vehicle 102 may not join a network associated with any of the charging stations 106, 108, and 110 until the association procedure is completed and the matched charging station is identified. In this embodiment, the electric vehicle 102 and the charging stations 106, 108, and 110 can use multi-network broadcast communications to reliably communicate with each other even though the electric vehicle 102 and the charging stations 106, 108, and 110 are not part of the same communication network. The operations of FIG. 1-5 using multi-network broadcast communications can be employed in environments where all the charging stations 106, 108, and 110 cannot form a single communication network (e.g., because of attenuation characteristics between the charging stations, because charging stations that belong to different owners (e.g., different manufacturers) may not be configured to communicate with each other, etc.). For example in a large parking lot, charging stations that are far away from each other may not be able to communicate with or "hear" each other. In this example, charging stations may form multiple networks and the electric vehicle 102 may communicate with charging stations from different communication networks. In some implementations, each charging station can be configured to form a communication network with those charging stations that are within a predetermined proximity. In other implementations, each charging station can be configured never to form a communication network with other charging stations.

In another embodiment, the electric vehicle 102 may join the network associated with one of the charging stations prior to initiating the association procedure. For example, the electric vehicle 102 and one of the charging stations 106 may use a suitable authentication mechanism (e.g., a unicast key exchange (UKE) based authentication mechanism) to form the network. In this example, a button associated with the electric vehicle 102 and the charging station 106 can be activated and, in response, the electric vehicle 102 and the charging station 106 can determine that they are connected via a charging cordset using, for example, a proximity detect feature. Proximity detect is a safety feature that enables the electric vehicle 102 and the charging station 106 to determine that they are physically connected so that the electric vehicle 102 is prevented from moving when the electric vehicle 102 is plugged into the charging station 106. In another embodiment, all the charging stations 106, 108, and 110 may be part of a common network and the electric vehicle 102 can join the common network prior to initiating (or as part of) the association procedure.

In some embodiments, each charging station 106, 108, and 110 may comprise one or more filter units to prevent signals received from the electric vehicle 102 from leaking to other charging stations. For example, if the charging station 106 receives a communication parameters request message from the electric vehicle 102, the filter unit associated with the charging station 106 can minimize/block appropriate frequencies so that the other charging stations 108 and 110 do not receive the communication parameters request message via the charging station 106 (or so that the charging stations 108 and 110 receive the communication parameters request message via the charging station 106 with a very high attenuation, or with very high attenuation on particular frequency bands). In some embodiments, the charging stations 106, 108, and 110 may also employ shielded cables to connect to an electric vehicle 102. This can enable isolation of signals transmitted by the electric vehicle 102, thus minimizing the possibility that charging stations that are not directly connected to the electric vehicle 102 detect signals from the electric vehicle 102 with a high signal level.

In some embodiments, after a charging station 106 receives a match notification message from the electric vehicle 102 indicating that the charging station 106 was selected as the matched charging station, the charging station (e.g., the association unit 116 or another suitable validation unit) can use suitable validation techniques to validate that the electric vehicle 102 is connected to the matched charging station 106. In some embodiments, the matched charging station 106 can use suitable out-of-band validation techniques that use a more secure communication medium to validate the electric vehicle 102 compared to the communication medium used for the association procedure. The communication medium used for validation may be a low bandwidth communication medium, but that is less susceptible to interception, modification, or spoofing than the communication medium that was used for executing the association procedure. In one example, the charging station 106 can modify the duty cycle of the Pulse Width Modulated (PWM) Control Pilot signal. The charging station (e.g., the HLE of the charging station 106) can transmit a validation request message (e.g., a CM_VALD_PWM.REQ message) to the electric vehicle 102 (e.g., to the HLE of the electric vehicle 102). The validation request message can serve as a request to the electric vehicle 102 to read the pilot line pulse width modulation value and transmit the value to the charging station 106. In some embodiments, the charging station 106 can transmit the validation request message using multi-network broadcast communication. In some embodiments, the charging station 106 can retransmit the validation request message until a validation confirmation message (e.g., a CM_VALD_PWM.CNF message) is received from the electric vehicle 102. After the electric vehicle 102 receives the validation request message, the electric vehicle 102 can determine the pilot line pulse width modulation value (e.g., a measured duty cycle value) and transmit this value to the charging station 106 in the validation confirmation message. In some embodiments, the electric vehicle 102 can transmit the validation confirmation message using multi-network broadcast communication. In response to receiving the validation confirmation message, the charging station 106 can compare the measured duty cycle value with the duty cycle value reported by the electric vehicle 102. If there is a match, the charging station 106 can transmit the match confirmation message (e.g., a CM_SLAC_MATCH.CNF message) discussed above at block 422 of FIG. 5, indicating that the validation process was successful.

It is noted that in some embodiments, the public key certificate (e.g., the X.509v3 certificate) may be too large for multi-network broadcast transmission. In this embodiment, various techniques can be employed for transmitting the public key certificate (e.g., from the electric vehicle 102 to the charging station 106). In some implementations, the charging station 106 can first obtain the electric vehicle's identity from the electric vehicle 102 and can then obtain the certificate associated with the electric vehicle 102 from an authorization server or a cache. In another implementation, the electric vehicle 102 can fragment its public key certificate and transmit fragments of the public key certificate to the charging station 106 across multiple MNBC transmissions. Likewise, similar operations can be executed to provide the public key certificates associated with the charging stations to the electric vehicle 102.

Finally, in some embodiments, the electric vehicle 102 and the charging station (e.g., the charging station 106) may also exchange user data as part of the association procedure. The user data can be exchanged to indicate, for example, that the electric vehicle 102 has disconnected from the charging station 106 (e.g., immediate disassociate), that the charging process should be terminated, etc.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like, conventional procedural programming languages, such as the "C" programming language or similar programming languages, and assembler or machine programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
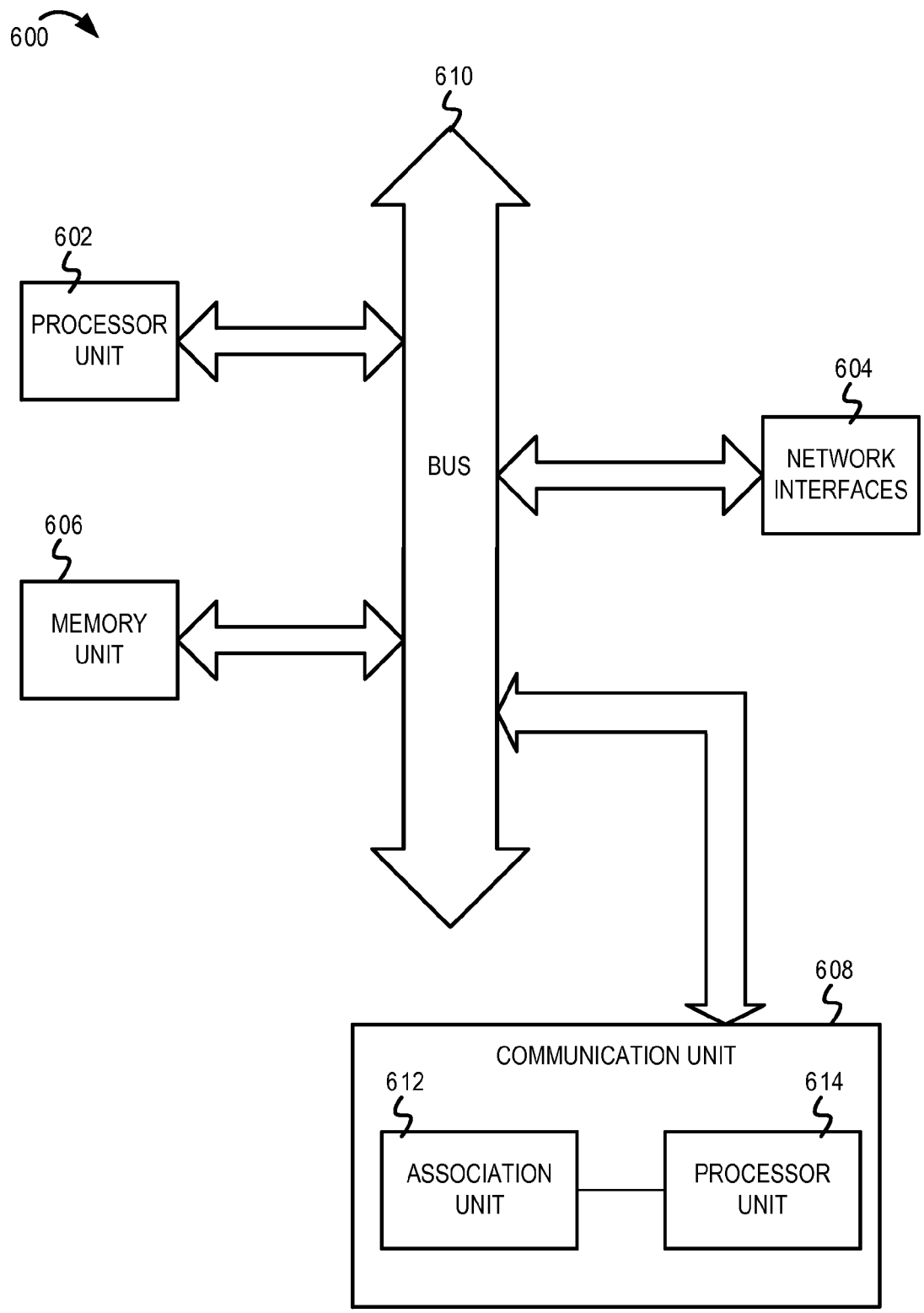
FIG. 6 is a block diagram of one embodiment of an electronic device including an attenuation level based association mechanism in a communication network.

FIG. 6 is a block diagram of one embodiment of an electronic device 600 including an attenuation level based association mechanism in a communication network. In some implementations, the communication network may be a public charging facility and the electronic device 600 may be a charging station (e.g., an electric vehicle supply equipment (EVSE) device). In other implementations, the electronic device 600 may be an electric vehicle (e.g., a plug-in electric vehicle or PEV) configured to receive electric power from one of the charging stations in the charging facility. The electronic device 600 (whether a charging station or an electric vehicle) may comprise wired communication capabilities (e.g., powerline communication capabilities) and/or wireless communication capabilities (e.g., WLAN communication capabilities). The electronic device 600 includes a processor unit 602 (possibly including multiple processors, multiple cores, multiple nodes, and/or implementing multi-threading, etc.). The electronic device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 also includes a bus 610 (e.g., PCI, ISA, PCI-Express, HyperTransport®, Infini-Band®, NuBus, AHB, AXI, etc.), and network interfaces 604 that include at least one of a wireless network interface (e.g., a Bluetooth interface, a WLAN 802.11 interface, a WiMAX interface, a ZigBee® interface, a Wireless USB interface, etc.) and a wired network interface (e.g., an Ethernet interface, a powerline communication interface, etc.).

The electronic device 600 also includes a communication unit 608. The communication unit 608 comprises an association unit 612 and a processor unit 614. When the electronic device 600 is an electric vehicle, the communication unit 608 can execute operations described above with reference to FIGS. 1-3 to exchange communications with one or more charging stations of a charging facility and identify a charging station with which to associate and from which to receive electric power. When the electronic device 600 is a charging station, the communication unit 608 can execute operations described above in FIGS. 1 and 4-5 to provide attenuation information associated with the charging station to the electric vehicle and (if selected as the matched charging station) associate with and provide power to the electric vehicle. In some embodiments, the processor unit 614 may execute the functionality of the association unit 612. In other embodiments, the processor unit 602 may execute the functionality of the association unit 612. In other embodiments, the processor units 602 and 614 may execute the functionality of the association unit 612 in conjunction.

Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, and the network interfaces 604 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the inventive subject matter is not limited to them. In general, an attenuation level based association mechanism as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   transmitting at least one broadcast message from a client network device to a plurality of target network devices;
   comparing attenuation information received from one or more target network devices of the plurality of target network devices with an attenuation threshold to determine whether to associate with one of the plurality of target network devices;
   determining to associate with a first target network device of the plurality of target network devices based, at least in part, on determining first attenuation information received from the first target network device does not exceed the attenuation threshold; and
   determining to retransmit the at least one broadcast message based, at least in part, on determining the attenuation information received from each of the one or more target network devices exceeds the attenuation threshold.

2. The method of claim 1, wherein transmitting the at least one broadcast message further comprises:

transmitting security information associated with the client network device to enable at least the first target network device to validate the client network device.

3. The method of claim 1, further comprising:
broadcasting a request for communication parameters from the client network device to the plurality of target network devices;
receiving, from at least the first target network device, a first communication parameter associated with the first target network device; and
determining a quantity of broadcast messages to transmit from the client network device based, at least in part, on the first communication parameter associated with the first target network device.

4. The method of claim 3, wherein broadcasting the request for communication parameters comprises:
initiating a time interval for receiving at least one communication parameter associated with at least one target network device;
determining the quantity of broadcast messages to transmit from the client network device in response to determining that the first communication parameter was received from the first target network device before the time interval elapses; and
re-broadcasting the request for the communication parameters in response to determining that at least one communication parameter from at least one target network device was not received before the time interval elapses.

5. The method of claim 3, further comprising:
determining to exchange secure communications with the first target network device based, at least in part, on the first communication parameter associated with the first target network device;
transmitting first security information associated with the client network device to at least the first target network device;
receiving second security information associated with the first target network device;
signing subsequent transmissions from the client network device using the first security information; and
receiving subsequent transmissions from the first target network device that are signed with the second security information.

6. The method of claim 3, wherein the first communication parameter associated with the first target network device includes at least one member of a group consisting of the quantity of broadcast messages that should be transmitted from the client network device to the first target network device, a maximum time interval for transmitting the quantity of broadcast messages, and an indication of whether secure communications are supported at the first target network device.

7. The method of claim 1, further comprising:
receiving a plurality of communication parameters from at least the first target network device;
combining the received plurality of communication parameters to determine a consolidated set of communication parameters; and
determining a quantity of broadcast messages to transmit from the client network device based, at least in part, on the consolidated set of communication parameters.

8. The method of claim 1, further comprising:
transmitting a first notification from the client network device to the first target network device to establish communications with the first target network device and to receive a service from the first target network device.

9. The method of claim 8, further comprising:
receiving a confirmation message at the client network device from the first target network device including a network parameter of a network associated with the first target network device; and
joining the network associated with the first target network device based, at least in part, on the network parameter to establish communications with the first target network device and to receive the service from the first target network device.

10. The method of claim 9, wherein the network parameter associated with the first target network device includes at least one member of a group consisting of a network identifier, a device address, and security information associated with the first target network device.

11. The method of claim 8, further comprising:
receiving a second notification at the client network device from the first target network device indicating that the client network device should associate with a second target network device of the plurality of target network devices and indicating a network parameter associated with the second target network device; and
joining a network of the second target network device based, at least in part, on the network parameter associated with the second target network device to establish communications with the second target network device and to receive the service from the second target network device.

12. The method of claim 1, further comprising:
transmitting a first amplitude map associated with the client network device to the first target network device;
receiving a second amplitude map associated with the first target network device at the client network device; and
determining a transmit power for communicating with the first target network device based, at least in part, on the first amplitude map and the second amplitude map.

13. The method of claim 1, wherein the client network device is a plug-in electric vehicle (PEV) and each of the plurality of target network devices is an electric vehicle supply equipment (EVSE) station.

14. The method of claim 1, further comprising:
broadcasting a notification to the plurality of target network devices to indicate a start of a transmission of the at least one broadcast message,
wherein the notification comprises at least one member of a group consisting of a maximum quantity of broadcast messages that will be transmitted, a maximum time interval for transmitting the at least one broadcast message, and an identifier of the client network device.

15. The method of claim 1, further comprising:
initiating a time interval for receiving the attenuation information from one or more target network devices;
determining to associate with the first target network device in response to determining that the first attenuation information is received from the first target network device before the time interval elapses and determining that the first attenuation information does not exceed the attenuation threshold; and
re-transmitting the at least one broadcast message in response to determining that the attenuation information from each of the one or more target network devices was not received before the time interval elapses.

16. The method of claim 1, wherein determining to associate with the first target network device further comprises:
determining a first attenuation level associated with the first target network device and a second attenuation level associated with a second target network device; and determining to associate with the first target network device based, at least in part, on determining that the first attenuation level is lower than the second attenuation level and determining that the first attenuation level does not exceed the attenuation threshold.

17. The method of claim 1, wherein determining to associate with the first target network device further comprises:
determining second attenuation information associated with the first target network device based, at least in part, on a transmission received at the client network device from the first target network device; and
determining whether to associate with the first target network device based, at least in part, on the first attenuation information received from the first target network device and the second attenuation information determined by the client network device for the first target network device.

18. The method of claim 1, wherein transmitting the at least one broadcast message comprises:
transmitting a first set of broadcast messages at a first transmit power from the client network device to the plurality of target network devices;
transmitting a second set of broadcast messages at a second transmit power in response to not receiving a response from any of the plurality of target network devices, wherein the second transmit power is greater than the first transmit power; and
transmitting a third set of broadcast messages at the first transmit power to the first target network device in response to receiving the response from at least the first target network device.

19. The method of claim 1, wherein the client network device is configured in a client operating mode and each of the plurality of target network devices is configured in a master operating mode.

20. A method comprising:
receiving, at a first service provider, a service matching broadcast message from a client network device;
determining first attenuation information based, at least in part, on the service matching broadcast message received at the first service provider, wherein
determining the first attenuation information includes determining an average attenuation level for at least a first carrier group of a plurality of frequency carriers associated with the service matching broadcast message;
transmitting the first attenuation information associated with the first service provider from the first service provider to the client network device; and
receiving a request at the first service provider from the client network device to associate with the client network device and to provide a service to the client network device based, at least in part, on the first attenuation information.

21. The method of claim 20, further comprising:
determining second attenuation information associated with a second service provider;
determining that the client network device should associate with the second service provider based, at least in part, on comparing the first attenuation information and the second attenuation information;
determining a network parameter associated with a first network of the second service provider; and
providing the network parameter associated with the second service provider to the client network device to cause the client network device to associate with the second service provider and to receive the service from the second service provider.

22. The method of claim 20, further comprising:
receiving first security information associated with the client network device at the first service provider;
transmitting second security information associated with the first service provider from the first service provider to the client network device in response to receiving the first security information;
determining to sign subsequent transmissions to the client network device using the second security information; and
determining to encrypt the subsequent transmissions to the client network device using the first security information.

23. The method of claim 20, wherein receiving the request to associate with the client network device comprises:
determining whether to associate with the client network device based, at least in part, on the first attenuation information;
in response to the first service provider determining to associate with the client network device,
transmitting a network parameter associated with a network of the first service provider from the first service provider to the client network device; and
configuring the first service provider with the network parameter to form a logical network with the client network device.

24. The method of claim 23, further comprising:
after the first service provider forms the logical network with the client network device, authenticating the client network device at the first service provider; and
providing the service to the client network device after successfully authenticating the client network device at the first service provider.

25. The method of claim 20, further comprising:
receiving a notification from the client network device that indicates a start of a transmission of the service matching broadcast message;
initiating a time interval to receive the service matching broadcast message in response to receiving the notification; and
transmitting the first attenuation information from the first service provider to the client network device after the time interval elapses.

26. The method of claim 20, further comprising:
utilizing a low bandwidth out-of-band communication medium to validate the client network device and to determine whether to associate with the client network device.

27. A first network device comprising:
a processor; and
a memory to store instructions, which when executed by the processor, cause the first network device to:
transmit at least one broadcast message to a plurality of target network devices;
compare attenuation information received from one or more target network devices of the plurality of target network devices with an attenuation threshold to determine whether to associate with one of the plurality of target network devices;
determine to associate with a first target network device of the plurality of target network devices based, at least in part, on determining first attenuation information received from the first target network device does not exceed the attenuation threshold; and determine to retransmit the at least one broadcast message based, at least in part, on determining the attenuation information received from each of the one or more target network devices exceeds the attenuation threshold.

28. The first network device of claim 27, wherein the instructions, which when executed by the processor, further cause the first network device to:
broadcast a request for communication parameters from the first network device to the plurality of target network devices;
receive, from at least the first target network device, a first communication parameter associated with the first target network device; and
determine a quantity of broadcast messages to transmit from the first network device based, at least in part, on the first communication parameter associated with the first target network device.

29. The first network device of claim 28, wherein the instructions, which when executed by the processor, further cause the first network device to:
determine to exchange secure communications with the first target network device based, at least in part, on the first communication parameter associated with the first target network device;
transmit first security information associated with the first network device to at least the first target network device;
receive second security information associated with at least the first target network device;
sign subsequent transmissions from the first network device using the first security information; and
receive subsequent transmissions from the first target network device that are signed with the second security information.

30. A first service provider comprising:
a processor; and
a memory to store instructions, which when executed by the processor, cause the first service provider to:
receive a service matching broadcast message from a client network device;
determine first attenuation information based, at least in part, on the service matching broadcast message received at the first service provider, wherein
determining the first attenuation information includes determining an average attenuation level for at least a first carrier group of a plurality of frequency carriers associated with the service matching broadcast message;
transmit the first attenuation information associated with the first service provider to the client network device; and
receive a request from the client network device to associate with the client network device and to provide a service to the client network device based, at least in part, on the first attenuation information.

31. The first service provider of claim 30, wherein the instructions, which when executed by the processor, further cause the first service provider to:
receive first security information associated with the client network device;
transmit second security information associated with the first service provider to the client network device in response to receiving the first security information;
determine to sign subsequent transmissions to the client network device using the second security information; and
determine to encrypt the subsequent transmissions to the client network device using the first security information.

32. The first service provider of claim 30, wherein the instructions, which when executed by the processor, further cause the first service provider to:
utilize a low bandwidth out-of-band communication medium to validate the client network device and to determine whether to associate with the client network device.

33. A non-transitory machine-readable storage medium having instructions stored therein, which when executed by a processor causes the processor to perform operations that comprise:
transmitting at least one broadcast message from a client network device to a plurality of target network devices;
comparing attenuation information received from one or more target network devices of the plurality of target network devices with an attenuation threshold to determine whether to associate with one of the plurality of target network devices;
determining to associate with a first target network device of the plurality of target network devices based, at least in part, on determining first attenuation information received from the first target network device does not exceed the attenuation threshold; and
determining to retransmit the at least one broadcast message based, at least in part, on determining the attenuation information received from each of the one or more target network devices exceeds the attenuation threshold.

34. The non-transitory machine-readable storage medium of claim 33, wherein the operations further comprise:
transmitting a first notification from the client network device to the first target network device to establish communications with the first target network device and to receive a service from the first target network device;
receiving a second notification at the client network device from the first target network device indicating that the client network device should associate with a second target network device and indicating a network parameter associated with the second target network device; and
joining a network of the second target network device based, at least in part, on the network parameter associated with the second target network device to establish communications with the second target network device and to receive a service from the second target network device.

35. A non-transitory machine-readable storage medium having instructions stored therein, which when executed by a processor causes the processor to perform operations that comprise:
receiving, at a first service provider, a service matching broadcast message from a client network device;
determining first attenuation information based, at least in part, on the service matching broadcast message received at the first service provider, wherein
determining the first attenuation information includes determining an average attenuation level for at least a first carrier group of a plurality of frequency carriers associated with the service matching broadcast message;
transmitting the first attenuation information associated with the first service provider from the first service provider to the client network device; and receiving a request at the first service provider from the client network device to associate with the client network device and to provide a service to the client network device based, at least in part, on the first attenuation information.

36. The non-transitory machine-readable storage medium of claim 35, wherein said operation of receiving the request at the first service provider further comprises:

utilizing a low bandwidth out-of-band communication medium to validate the client network device and to determine whether to associate with the client network device.

37. The method of claim 1 further comprising:

receiving a pilot signal from the first target network device on a charging cable associated with the first target network device, wherein a duty cycle of the pilot signal is modified at the first target network device prior to transmitting to the client network device;

receiving a validation request from the first target network device requesting the client network device to determine the duty cycle of the pilot signal; and providing an indication of the duty cycle of the pilot signal detected by the client network device to the first target network device, wherein the first target network device determines whether to associate with the client network device based, at least in part, on the duty cycle determined by the first target network device and the duty cycle determined by the client network device.

38. The method of claim 1, wherein the at least one broadcast message is a multi-network broadcast message.

39. The method of claim 20, further comprising:

determining, at the first service provider, whether the first attenuation information exceeds a threshold;

determining to transmit the first attenuation information to the client network device in response to determining that the first attenuation information does not exceed the threshold; and determining not to transmit the first attenuation information to the client network device in response to determining that the first attenuation information exceeds the threshold.

40. The method of claim 21, wherein:

the first service provider is part of a second network, the second service provider is part of the first network, and the service matching broadcast message is a multi-network broadcast message.

* * * * *